US012725435B2

(12) United States Patent
Hawe et al.

(10) Patent No.: US 12,725,435 B2
(45) Date of Patent: Sep. 1, 2026

(54) FIM-CNN FOR DETECTION OF VIABLE CELLS AND/OR PARTICULATE IMPURITIES

(71) Applicant: Coriolis Pharma Research GmbH, Martinsried (DE)

(72) Inventors: Andrea Hawe, Martinsried (DE); Tim Menzen, Martinsried (DE); Adam Grabarek, Martinsried (DE); Alexandra Roesch, Martinsried (DE)

(73) Assignee: Coriolis Pharma Research GmbH, Martinsried (DE)

( * ) Notice: Subject to any disclaimer, the term of this patent is extended or adjusted under 35 U.S.C. 154(b) by 382 days.

(21) Appl. No.: 18/554,201

(22) PCT Filed: Apr. 8, 2022

(86) PCT No.: PCT/EP2022/059445
§ 371 (c)(1),
(2) Date: Oct. 6, 2023

(87) PCT Pub. No.: WO2022/214662
PCT Pub. Date: Oct. 13, 2022

(65) Prior Publication Data

US 2024/0127611 A1 Apr. 18, 2024

(30) Foreign Application Priority Data

Apr. 9, 2021 (EP) .................................... 21167650

(51) Int. Cl.
*G06V 20/69* (2022.01)
*G01N 1/30* (2006.01)
(Continued)

(52) U.S. Cl.
CPC ............ *G06V 20/698* (2022.01); *G01N 1/30* (2013.01); *G01N 15/01* (2024.01);
(Continued)

(58) Field of Classification Search
CPC .... G06V 20/698; G06V 10/774; G06V 10/82; G06V 20/70; G06V 2201/03;
(Continued)

(56) References Cited

U.S. PATENT DOCUMENTS

2021/0004984 A1* 1/2021 Ji .............................. G06T 7/11
2021/0118146 A1* 4/2021 Rhodes .................... G06N 3/09
(Continued)

FOREIGN PATENT DOCUMENTS

WO 2020028313 A1 2/2020

OTHER PUBLICATIONS

Nitta, Nao , et al., "Intelligent Image-Activated Cell Sorting", vol. 175, No. 1, Aug. 27, 2018, Sep. 20, 2018, pp. 266-276.

*Primary Examiner* — Han Hoang
(74) *Attorney, Agent, or Firm* — Synergy IP Group AG; Lily Ackerman

(57) ABSTRACT

The disclosure presented herein provides methods for quantifying viable cells and particulate cell impurities in a cell-based product sample. The method is implemented on a convolutional neural network (CNN) that learns to classify flow-imaging microscopy (FIM) images. The CNN learning is accomplished by using a training set of classified images of viable cells and different types of impurities.

8 Claims, 22 Drawing Sheets

(51) Int. Cl.

| | |
|---|---|
| ***G01N 15/01*** | (2024.01) |
| ***G01N 15/10*** | (2006.01) |
| ***G01N 15/1433*** | (2024.01) |
| ***G06V 10/774*** | (2022.01) |
| ***G06V 10/82*** | (2022.01) |
| ***G06V 20/70*** | (2022.01) |

(52) U.S. Cl.
CPC ..... *G01N 15/1023* (2024.01); *G01N 15/1433* (2024.01); *G06V 10/774* (2022.01); *G06V 10/82* (2022.01); *G06V 20/70* (2022.01); *G01N 2015/1006* (2013.01); *G06V 2201/03* (2022.01)

(58) Field of Classification Search
CPC .......... G06V 20/69; G01N 1/30; G01N 15/01; G01N 15/1023; G01N 15/1433; G01N 2015/1006; G01N 15/1436; G01N 15/1459; G01N 21/6486; G06N 3/0464
See application file for complete search history.

(56) References Cited

U.S. PATENT DOCUMENTS

| | | | | |
|---|---|---|---|---|
| 2021/0303818 | A1* | 9/2021 | Randolph | G01N 15/147 |
| 2022/0088070 | A1* | 3/2022 | Albertson | C12N 5/0636 |
| 2022/0290183 | A1* | 9/2022 | Davalos | C12N 15/87 |
| 2022/0392613 | A1* | 12/2022 | Aifuwa | G06N 3/045 |
| 2023/0257479 | A1* | 8/2023 | Satijn | A61P 35/00 424/133.1 |

* cited by examiner

Viable (healthy)

Apoptotic

Necrotic

Debris

FIM-CNN FOR DETECTION OF VIABLE CELLS AND/OR PARTICULATE IMPURITIES

CROSS REFERENCE TO RELATED APPLICATIONS

This application is a United States National Stage Application filed under 35 U.S.C. § 371 claiming the benefit of PCT Application No. PCT/EP2022/059445, filed on Apr. 8, 2022, which claims priority to and the benefit of EP Application Serial No. 21167650.7, filed on Apr. 9, 2021, all of which are hereby incorporated by reference herein in their entireties.

FIELD OF THE DISCLOSURE

The disclosure presented herein provides methods for quantifying viable cells and particulate cell impurities in a cell-based product sample. The method is implemented on a convolutional neural network (CNN) that learns to classify flow-imaging microscopy (FIM) images. The CNN learning is accomplished by using a training set of classified images of viable cells and different types of impurities.

BACKGROUND

The number of cell-based medicinal products (CBMPs) entering clinical trials and being approved by major regulatory bodies for commercial use is consistently increasing each year. Despite the promising clinical data emerging from the use of these innovative therapeutic products, many challenges remain in the areas of manufacturing, formulation development and analytical characterization.

Most CBMPs consist of living cells which are intrinsically fragile and much more susceptible to unfavorable conditions compared to other biotherapeutics, such as protein-based products. Nonetheless, irrespective of the type of the CBMP (e.g., autologous or allogenic, genetically modified or not), they often undergo multiple and complex manufacturing steps before being administered to the patient. The main processing steps CBMPs undergo during their production include isolation of cells from a healthy donor or patient, ex-vivo cell manipulation, formulation, storage, and quality control prior to release and administration. Furthermore, between each of the above listed steps, transportation, freeze-thawing or manual handling of CBMPs occurs. With clinical site-specific handling procedures, differences in processing and administration of the product will also occur. Such diverse and multistep production and handling process exposes cells to a range of intended and/or accidental environmental stress factors, such as freeze-thawing, surface related stress (i.e. mechanical stress), thermal and oxidative stress. Each of these kinds of stresses may result in accidental cell death. Therefore, examination of the impact of formulation parameters on cell stability under these stress conditions should be considered to better understand the sensitivity of the product to the stress factors involved. This will likely contribute to new insights that can be employed to mitigate the potential risk of therapeutic failure and the occurrence of serious adverse effects due to poor product quality.

Introduction or formation of particulate impurities in CBMPs is one of the potential risks associated with manufacturing and handling of these drug products. Particles found in CBMPs can originate from either the process or the cell product itself. Process-related particulate impurities may include ineffectively removed antibody coated magnetic beads used for activation and expansion of cells, viral vectors utilized in a cell transduction step, extrinsic particles (glass, fiber, rubber), or leachables derived from primary containers. Sterile filtration of cell suspensions is not possible because of the inherent size of cells; therefore, unwanted micrometer-sized particles will remain in the product if their removal is not complete. Cellular impurities, on the other hand, comprise of materials originating from cells. These may be non-viable or non-therapeutic cells, as well as cell agglomerates and cellular debris. For example, necrosis induced in cells exposed to extreme physiological conditions (pyroptosis) leads to plasma membrane rupture, release of intracellular contents and formation of debris particles. In contrast to apoptotic (programmed) cell death, where cellular components are packaged into vesicles and digested by appropriate caspases for facilitated removal by the immune system, necrosis produces debris with potent inflammatory properties. One of the results from these debris particles may be an adverse immune response upon administration. Furthermore, if larger micrometer-sized particles are introduced into the smaller blood vessels, they may result in tissue damage from thromboembolism.

Forced degradation studies are commonly included in the development of any pharmaceutical product as part of establishment of analytical methods and formulation screenings. Alongside real time stability studies at the intended storage conditions, forced degradation studies are applied to estimate the shelf-life of, e.g., protein-based biopharmaceuticals as well as define suitable storage and handling conditions. Moreover, this type of studies can simulate accidental exposure of drug products to deleterious conditions and assist in the evaluation of potential risks occurring to drug products throughout their product life-cycle. These studies also assist in selecting appropriate excipients during formulation development where the aim is to determine a component mixture achieving maximum stability for the active pharmaceutical ingredient. Even though the manufacturability, critical quality attributes (CQAs), degradation pathways and product degradants in CBMPs will vary substantially from, e.g., protein-based therapeutics, the same concept of forced degradation studies can be highly relevant in process and product development of CBMPs.

Extensive testing of a CBMP prior to administration to a patient is a regulatory obligation to assure the product is safe, efficacious and of good quality. The testing parameters include identity, purity, activity and potency of cells, however also cellular and non-cellular materials must be identified and qualified. For this purpose, reliable analytical methods for characterization of product quality and stability testing are necessary.

There remains a critical need for automated and label free methods for quantifying impurities in cell-based products. Neural networks were shown to be valuable for classifying different types of images. However, their application for analysis of flow-imaging microscopy (FIM) of cells products involves a number of challenges, as for example training the neural network with a sizeable dataset consisting of accurately selected cell images from each population. As disclosed herein, obtaining such a training dataset encompasses several difficulties, and datasets with mixed particle images lead to a high number of errors in the classification of FIM-obtained cells images. Further, it is unforeseeable whether a neural network is robust enough as to be trained with a dataset comprising such a high number of misclassified images.

The present application discloses flow imaging microscopy coupled with convolutional neural networks (FIM- CNN) to establish a high-throughput and label free method for quantification of viable cells, necrotic cells, apoptotic cells, debris particles, magnetic beads, and dducts (single cell with attached bead(s)).

SUMMARY OF THE DISCLOSURE

In one aspect, disclosed herein is a method for quantifying single viable cells and/or particulate impurities in a cell-based product sample, said method comprising: a) Providing a training set of classified flow-imaging microscopy (FIM) images comprising single viable cells, debris, and at least one of: necrotic cells, apoptotic cells, doublet cells, magnetic beads, or adducts; b) Training a convolutional neural network (CNN) with the classified images of step (a); c) Capturing FIM images from said product sample; d) Identifying single viable cells, necrotic cells, apoptotic cells, doublet cells, magnetic beads, adducts, and debris, by applying the trained CNN obtained in step (b) to the FIM images of step (c); e) Quantifying the single viable cells and/or the particulate impurities identified in step (d).

In some related aspect, the set of classified images comprises: single viable cells, necrotic cells, apoptotic cells, doublet cells, magnetic beads, adducts, and debris; single viable cells, doublet cells, magnetic beads, adducts, and debris; single viable cells, necrotic cells, and debris; or single viable cells, necrotic cells, apoptotic cells, and debris.

In some related aspect, the classified images of step (a) are obtained by a method comprising: i) Providing a cell suspension; ii) Applying to said cell suspension conditions for inducing necrosis, apoptosis, cell debris, adducts, or any combination thereof, in said cell culture; iii) Optionally labeling the cells; iv) Obtaining FIM images of said cell culture; and v) Classifying said FIM images.

In some related aspect, the culture conditions for inducing necrosis and/or for inducing debris comprise submitting said cell culture to a stress condition; said culture conditions for inducing apoptosis comprise incubating said cell culture with a pro-apoptotic reagent; said culture conditions for inducing adducts comprise incubating said cells with magnetic beads; or any combination thereof.

In some related aspect, the stress conditions for inducing necrosis comprise shaking stress, a freeze-thawing cycle, heat, incubation with ethanol, or any combination thereof. In some related aspect, the pro-apoptotic agent comprises staurosporin. In some related aspect, the cells are incubated with said magnetic beads in a ratio of about 1:1.

In some related aspects, the conditions that induce necrosis comprise incubating cells at 55° C. for 90 min, or at 37° C. for 90 min in a cell culture comprising 10% ethanol; the conditions that induce apoptosis comprise incubating the cells with 1 μM staurosporin for 3 hours at 37° C.; the conditions that induce debris comprise vortexing cells in a 2-mL microcentrifuge tube for 2 min, or submitting the cells to two freeze-thaw cycles from −140° C. to 37° C.; and the conditions that induce adducts comprise incubating magnetic beads with cells in a 1:1 ratio for 1.5 hours at 37° C.

In some related aspect, the necrotic cells from the training set comprise cells incubated at 37° C. for 90 min in a cell culture comprising 10% ethanol, and cells incubated at 55° C. for 90 min. In some related aspect, the classified images of step (a) are obtained by a method comprising: i) Obtaining a sample of said cell-based product; ii) Optionally labeling the cells of said sample of step (i); iii) Obtaining FIM images of said sample of steps (i) or (ii); and iv) Classifying said FIM images.

In some related aspect, viable cells from the training set comprise cells incubated in a hypotonic medium, cells incubated in an isotonic medium, and cells incubated in a hypertonic medium.

In some related aspect, the CNN is pre-trained before step (b) with a pre-training set of images. In some related aspect, the CNN comprises a VGG-19 architecture. In some related aspect, only the last two fully connected layers of said CNN are active; or the first ten layers of said CNN are frozen; during said training of step (b).

In some related aspect, the training of step (b) comprises the Adam optimization algorithm or the SGD optimization algorithm. In some related aspect, the cell-product comprises T cells.

In some aspects, disclosed herein is a method for quantifying single viable cells and/or particulate impurities in a cell-based product sample, said method comprising: (a) Providing a cell suspension comprising single viable cells, necrotic cells, and/or apoptotic cells; (b) Simultaneously obtaining a brightfield image and a fluorescent signal from said cell suspension using an imaging flow cytometer; wherein said fluorescent signal is used to attribute a classification label to said brightfield image, according to whether said brightfield image comprises a viable cell, a necrotic cell, or an apoptotic cell; (c) Training a convolutional neural network (CNN) with the brightfield images of step (b); (d) Capturing flow-image microscopy (FIM) images from said product sample; (e) Identifying single viable cells, debris, and at least one of: necrotic cells, apoptotic cells, doublet cells, magnetic beads, or adducts, by applying the trained CNN obtained in step (c) to the FIM images of step (d); (f) Quantifying the single viable cells and/or the particulate impurities identified in step (e).

BRIEF DESCRIPTION OF THE DRAWINGS

FIG. 7A shows particle size distributions of samples containing Jurkat cells at a 375,000 cells/mL concentration. FIG. 7B shows particle size distributions of samples containing Dynabeads at a 68,000 beads/mL concentration. FIG. 7C shows particle size distributions of samples containing Jurkat cells with Dynabeads.

FIG. 8A shows the concentration of Dynabeads determined in a concentration series of Dynabeads suspended in RPMI buffer (DB ctrl, gray) and in cell suspensions (DB+cells, black). FIG. 8B shows recovery (left y-axis) and coefficient of variation (right y-axis) of Dynabeads in RPMI buffer (gray) and cell suspensions (black). Error bars represent the standard deviation of mean values of six replicates. Coefficients of variation (%) were calculated from six replicate measurements.

FIG. 9A shows the determination of concentration of Dynabeads in a concentration series of Dynabeads suspended in RPMI medium (DB ctrl, gray) and in Jurkat cell suspensions (DB+cells, black). FIG. 9B shows the recovery (left y-axis, black) and corresponding coefficient of variation (CV; right y-axis, red) of Dynabeads in RPMI medium (open squares) and Jurkat cell suspensions (closed squares). Error bars represent the standard deviation of mean values of six replicates. The coefficient of variation values (%) were calculated from the six replicate measurements.

FIG. 10A shows cell concentrations determined by using CNN (filled bars) and particle morphological parameters (empty bars) in samples with different concentrations of spiked Dynabeads. FIG. 10B shows debris concentrations determined by using CNN (filled bars) and particle morphological parameters (empty bars) in samples with different concentrations of spiked Dynabeads. FIG. 10C shows adduct concentrations determined by using CNN (filled bars) and particle morphological parameters (empty bars) in samples with different concentrations of spiked Dynabeads. Error bars represent standard deviations of mean concentrations from intra-day triplicate measurements.

FIG. 16A shows the determination of concentration of cellular debris, viable and necrotic cells measured by using FIM-CNN (FIM) and automated cell counting (ACC). FIG. 16B shows the measurement of cell viability by performing calcein-AM (CA), propiodium iodide (PI) and FIM-CNN assays. FIG. 16C shows the assessment of cell apoptosis with Annexin V-FITC assay. FIG. 16D shows the assessment of cell apoptosis by LDH release. Error bars represent standard deviations of mean values.

FIG. 17A shows the cell diameter as measured by using FIM after thawing at 5° C. and 37° C. FIG. 17B shows exemplary images of particles detected in Jurkat cell suspensions after thawing at 5° C.

FIG. 18A shows the concentration of total (viable+necrotic+apoptotic) cells as measured by FIM. FIG. 18B shows the concentration of debris particles. FIG. 18C shows cell viability as determined by using calcein-AM (CA), propidium iodide (PI) and FIM-CNN (FIM) assays. Error bars represent standard deviation of mean values.

FIG. 19A shows a LDH release assay. FIG. 19B shows apoptotic cell fraction quantified by using imaging flow cytometry (Annexin V-FITC assay). Error bars represent standard deviation of mean values.

FIGS. 20A-20C show cell suspensions without or with FBS (10% (v/v)) before (T0) and after shaking (T1) or quiescent storage (Ctrl) at room temperature. FIG. 20A shows total concentration of cells (viable and necrotic) and debris particles by using FIM. FIGS. 20B and 20D show LDH release (FIG. 20B) and apoptotic cell fraction (FIG. 20C) quantified by using imaging flow cytometry (Annexin V-FITC assay) at given time points. Error bars represent standard deviation of mean values.

FIG. 28A shows a sample treated with digitonin to induce necrosis. FIG. 28B shows freshly thawed cells.

FIG. 29A shows a sample treated with camptothecin to induce apoptosis. FIG. 29B shows an untreated sample as negative control.

FIG. 35A shows the classification into Hyper, Iso, Hypo, necrotic and apoptotic classes. FIG. 35B shows the classification of the viable cells.

DETAILED DESCRIPTION

Figure 1:
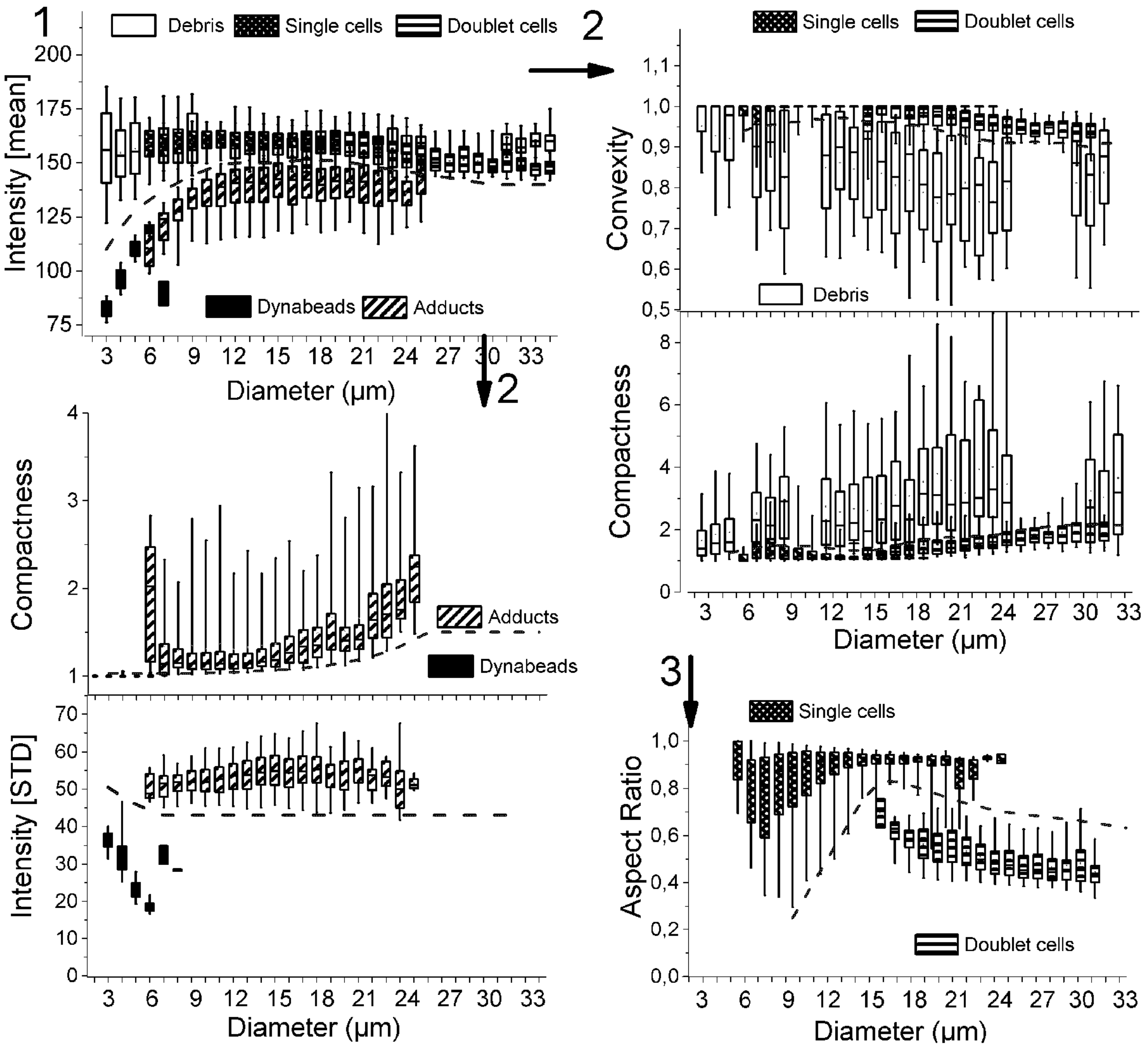
FIG. 1 shows the clustered morphological parameters used to discriminate the five particle populations by using the output data from the FlowCam software. Arrows with accompanying numbers show the order in which the separation of particle populations was carried out.

The present subject matter may be understood more readily by reference to the following detailed description, which forms a part of this disclosure. It is to be understood that this disclosure is not limited to the specific products, methods, conditions or parameters described and/or shown herein, and that the terminology used herein is for the purpose of describing particular embodiments by way of example only and is not intended to be limiting of the claimed disclosure.

Unless otherwise defined herein, scientific and technical terms used in connection with the present application shall have the meanings that are commonly understood by those of ordinary skill in the art. Further, unless otherwise required by context, singular terms shall include pluralities and plural terms shall include the singular.

In the present disclosure the singular forms "a," "an," and "the" include the plural reference, and reference to a particular numerical value includes at least that particular value, unless the context clearly indicates otherwise. The term "plurality", as used herein, means more than one. When values are expressed as approximations, by use of the antecedent "about," it is understood that the particular value forms another embodiment. All ranges are inclusive and combinable. In some embodiments, the term "about", refers to a deviance of between 0.0001-10% from the indicated number or range of numbers. In some embodiments, the term "about", refers to a deviance of up to 25% from the indicated number or range of numbers. The term "comprises" means encompasses all the elements listed, but may also include additional, unnamed elements, and it may be used interchangeably with the terms "encompasses", "includes", or "contains" having all the same qualities and meanings. The term "consisting of" means being composed of the recited elements or steps, and it may be used interchangeably with the terms "composed of" having all the same qualities and meanings.

The present disclosure relates to methods for quantifying single viable cells and/or particulate impurities in a cell-based product sample, said method comprising:

a. Providing a training set of classified flow-imaging microscopy (FIM) images comprising single viable cells, debris, and at least one of: necrotic cells, apoptotic cells, doublet cells, magnetic beads, or adducts;
b. Training a convolutional neural network (CNN) with the classified images of step (a);
c. Capturing FIM images from said product sample;
d. Identifying single viable cells, debris, and at least one of: necrotic cells, apoptotic cells, doublet cells, magnetic beads, or adducts, by applying the trained CNN obtained in step (b) to the FIM images of step (c);
e. Quantifying the single viable cells and/or the particulate impurities identified in step (d).

Cells and Particulate Impurities

In some embodiments, a cell comprises any type of cell used in pharmaceutical products. In some embodiments, a cell comprises any type of cell used for cancer immunotherapy. In some embodiments, a cell comprises a natural killer (NK) cell, a lymphokine-activated killer cell, a T cell, a cytotoxic T cells, a memory T cell, or a dendritic cell. In some embodiments, a cell comprises a genetically engineered cell. In some embodiments, a cell comprises a cell expressing a chimeric antigen receptor (CAR). In some embodiments, a cell comprises a CAR-T Cell.

In some embodiments, a cell comprises any type of cell used in regenerative medicine. In some embodiments, a cell comprises a stem cell, a progenitor cell, a differentiated cell, a mesenchymal stem cell, a hematopoietic stem cell, an induced pluripotent somatic cell (iPSC), an adipose cell, a cardiomyocyte, a chondrocyte, an islet cell, or an insulin producing cell. In some embodiments, a cell comprises a cell used in gene therapy. In some embodiments, a cell comprises a somatic cell.

In some embodiments, a cell comprises an allogeneic or an autologous cell. In some embodiments, a cell comprises a human or an animal cell.

A skilled artisan would appreciate that CARs comprise engineered receptor proteins that give T cells the ability to target specific proteins. These receptors combine both antigen-binding and T-cell activating functions into a single receptor. By expressing CARs in this manner, T cells can bind the antigen recognized by the CAR and are activated in its presence.

A skilled artisan would appreciate that a viable cell refers to a cell that can grow in a culture, or in any suitable medium. This is in contrast to nonviable cells, which are dead cells unable to grow, and/or to reproduce. A number of methods are available in the art for determining whether a cell is a viable cell, these methods include colorimetric methods, Coulter counter, flow cytometry, and morphology-based methods.

In some embodiments, the images of viable cells used in the training set comprise images of viable cells grown under similar culture conditions. The experimental data provided herein indicates that the accuracy of the CNN classifier can be increased by training the CNN with heterogeneous images within each category. Therefore, in some embodiments, the viable cell images of the training set comprise images of viable cells suspended in solutions with different osmolalities. In some embodiments, the image training set comprises images of viable cells suspended in isotonic conditions, of viable cells suspended in hypotonic conditions, and of viable cells suspended in hypertonic conditions. In some embodiments, the CNN classifies all viable cells suspended under different osmolalities into a single category of viable cells.

In some embodiments, a hypotonic solution comprises a lower concentration of solutes than the cell. In some embodiments, a hypotonic solution comprises an osmolality of 220, 250 or 270 mOsm/kg. Said hypotonic osmolality can be obtained, for example, by diluting phosphate saline buffer (PBS) in water. In some embodiments, a hypertonic solution comprises a higher concentration of solutes than the cell. In some embodiments, a hypertonic solution comprises an osmolality of 350, 400, 420 or 450 mOsm/kg. Said hypertonic osmolality can be obtained by adding to PBS different amounts of sucrose. In some embodiments, any isotonic cell medium, for example PBS, can be used for incubating cells in isotonic conditions.

A skilled artisan would appreciate that the term particulate impurities may refer to any undesirable molecule present in a cell product. In some embodiments, a particulate impurity comprises a non-cellular impurity. In some embodiments, a non-cellular impurity comprises a magnetic bead.

A skilled artisan would appreciate that several magnetic beads are available in the art for magnetically sorting cells. Any of these can be used in the methods disclosed herein. In some embodiments, a magnetic bead comprises a Dynabead. In some embodiments, a magnetic bead comprises a magnetic microparticle coated with an antibody. In some embodiments, a magnetic bead comprises a magnetic nanoparticle coated with an antibody.

In some embodiments, a particulate impurity comprises a cell-derived impurity. In some embodiments, a cell-derived impurity comprises debris. In some embodiments, a cell-derived impurity comprises a necrotic cell. In some embodiments, a cell-derived impurity comprises an apoptotic cell. In some embodiments, a cell-derived impurity comprises a doublet cell.

As used herein, the term "doublet cell" refers to two cells captured in a single microscopy image. In some embodiments, a doublet cells refers to two cells physically coupled. In some embodiments, a doublet cell refers to two cells in close proximity which were captured in a single image and are detected as if they were a single cell. In cases in which doublet cells are not physically coupled, they are not necessarily regarded as a pharmaceutical or clinical impurity. However, non-coupled doublet cells are regarded herein as impurities as they interfere with the correct quantification of cells. In some embodiments, the identified doublet cells are counted as two cells for the purposes of reporting the total determined concentration of cells.

The method disclosed herein can be applied to quantify cells and impurities in any composition comprising cells. In some embodiments, the method is applied to quantify cells and impurities in a cell-based product sample. A skilled artisan would appreciate that a cell-based product comprises a pharmaceutical product, medication or medicine, i.e., a composition used to treat, cure, prevent, or diagnose a disease or to promote well-being. Further, a cell-based product comprises an approved drug, a drug candidate, or a product being researched, tested, stored, developed, labelled, manufactured, marketed, sold and/or distributed by a pharmaceutical company.

A skilled artisan that a sample might comprise any part of the analyzed cell-based product. In some embodiments, a sample comprises a volume of the cell product randomly obtained to represent the constitution of the cell-based product. In some embodiments, a sample comprises a number of samples taken either at different time points, or from different parts of the cell-product. In some embodiments, a sample comprises the whole cell product.

Convolutional Neural Networks

The methods disclosed herein comprises the use of a neural network for identifying cells and/or impurities in a cell-based product. A skilled artisan would appreciate that a neural network, or an artificial neural network, refers to a collection of connected nodes called neurons, interconnected by edges. A description of a neural network and its use for image recognition can be found, for example, in Valueva M V et al. (2020). Application of the residue number system to reduce hardware costs of the convolutional neural network implementation. Mathematics and Computers in Simulation. Elsevier BV. 177: 232-243. doi: 10.1016/j.matcom.2020.04.031. ISSN 0378-4754. Neurons and edges have weights that adjust during learning or training process. In the present disclosure, said learning comprises providing a set of classified images of single viable cells, debris, necrotic cells, apoptotic cells, doublet cells, magnetic beads, and/or adducts. Typically, neurons are aggregated into layers. A signal, as a microscopy image, travel from the first layer (the input layer), to the last layer (the output layer), possibly after traversing the layers multiple times.

Deep neural networks are neural networks with multiple layers between the input and output layers. In some embodiments, the methods disclosed herein comprise the use of a deep neural network. Convolutional neural networks (CNN) are a class of deep neural networks, commonly applied to analyzing visual imagery. CNN are multilayer fully connected networks, that is, each neuron in one layer is connected to all neurons in the next layer.

In the methods disclosed herein, the input layer of the CNN is fed with magnified images of a cell-based product sample. In some embodiments, said image is obtained by flow-imaging microscopy (FIM). A skilled artisan would appreciate that FIM, which is sometimes also referred to as "dynamic image analysis", comprises any instrument consisting of a microscope positioned and configured as to capture images of a flow cell. A number of FIM systems are available in the art, and any of them can be used with the methods disclosed herein. In some embodiments, a FIM comprises a FlowCam® (Yokogawa Fluid Imaging Technologies Inc.). In some embodiments, a FIM is selected from a group comprising MFI™ (ProteinSimple), iSpect IDA-10 (Shimadzu), Occhio (Occhio Instruments SA), and FlowSight® Imaging Flow Cytometer (Merck).

In some embodiments, obtaining a flow-imaging microscopy image comprises capturing an image of a field with a digital camera, and optionally segmenting said image with a gray scale thresholding process as to create a binary image of each particle. In some embodiments, an image is obtained by optical microscopy, fluorescent microscopy, polarizing microscopy, phase contrast microscopy, or a differential interference contrast microscopy.

In some embodiments, the method disclosed herein quantifies the number of single viable cells, necrotic cells, apoptotic cells, doublet cells, magnetic beads, adducts, or debris, in the analyzed sample. In some embodiments, said quantification comprises assigning each image to a category, e.g., single viable cells, apoptotic cells, etc., and adding the number of images assigned to each category. In some embodiments, said quantification comprises providing the number of single viable cells and/or impurities in the sample. In some embodiments, said quantification comprises calculating a probability function for each of the analyzed images. In some embodiments, said quantification comprises adding the probability functions of all the analyzed images.

A skilled artisan would appreciate that CNNs for image classification may comprise different architectures. Any of these architectures can be used in the methods disclosed herein. In some embodiments, the CNN comprises a VGG-19 architecture, a description of which can be found for example in Simonyan K et al. Very deep convolutional networks for large-scale image recognition; 2014. http://arxiv.org/pdf/1409.1556v6. VGG-19 is a neural network architecture comprising 19 layers deep and an image input size of 224-by-224. VGG-19 CNN were pretrained on more than a million images from the ImageNet database. VGG-19 CNN was shown to classify images into 1000 object categories.

In some embodiments, only a part of the CNN connected layers are active, while the rest are frozen. Any number of layers can be active during training with the cell image dataset. In some embodiments, the last two fully connected layers are active during training. In some embodiments, the first ten layers are frozen, and the rest are active.

A number of algorithms can be used for training CNNs, and any of these can be applied to train the CNN disclosed herein. In some embodiments, the CNN is trained with the Adam optimization algorithm. In some embodiments, the CNN is trained with the SGD optimization algorithm.

Training Set

The methods disclosed herein comprise training a CNN with a set of classified images from different categories. In some embodiments, the categories are selected from a group comprising single viable cells, necrotic cells, apoptotic cells, doublet cells, magnetic beads, adducts, and debris. In some embodiments, the training set comprises images from 2, 3, 4, 5, 6, 7, or more categories.

In some embodiments, the training set comprises single viable cells, necrotic cells, apoptotic cells, doublet cells, magnetic beads, adducts, and debris. In some embodiments, the training set comprises single viable cells, doublet cells, magnetic beads, adducts, and debris. In some embodiments, the training set comprises single viable cells, necrotic cells, and debris. In some embodiments, the training set comprises single viable cells, necrotic cells, apoptotic cells, and debris.

For the CNN to learn differentiating a category accurately, the CNN must be first trained with a large number of images correctly assigned to said category. Image mislabeling in the training set reduces the CNN future ability to identify members of said category. For example, labeling viable cells as apoptotic, will impair the CNN future ability to differentiate between viable and apoptotic cells. Though correct labeling of training images may seem trivial, in practice it poses a number of complex obstacles:

a. Cell cultures comprise millions of cells, and they react differently to the same external conditions. For example, treatment of a cell population with a pro-apoptotic agent usually induces apoptosis in only a fraction of the population. Labeling all cells that underwent such a pro-apoptotic treatment as "apoptotic", and using said labeling for training a CNN would be deleterious to the CNN performance. In this case, the CNN ability to distinguish between apoptotic and non-apoptotic cells will be low.

b. In principle, a number of methods are available to confirm whether a cell is apoptotic, as labeling the cell with an apoptotic marker. While those methods are broadly used in static microscopy, they cannot be applied to FIM due to the intrinsic characteristics of the system. In FIM, images are taken from a flowing fluid as it pass through a flow cell, and there is no possibility of obtaining a fluorescent image (to confirm the nature of the cell) concomitantly with a brightfield image (to train the CNN).

c. Thus, the solution proposed herein comprises obtaining highly homogeneous populations of either viable cells, necrotic cells, apoptotic cells, or adducts; and assigning all those cells to the correspondent category. Since the population is homogenous enough, the CNN can tolerate the mislabeling and still achieves a high classification accuracy.

The finding presented herein, according to which it is possible to train a FIM-CNN accurately with the training sets herein disclosed, is surprising and unexpected.

A number of different image training sets were tested, but failed to train the CNN satisfactorily. Appropriate sets of images were obtained only after extensive experiments and analyses as detailed in the Examples section.

In some embodiments, the training set is obtained by a method comprising:

i) Providing a cell suspension;
ii) Applying to said cell suspension conditions for inducing necrosis, apoptosis, cell debris, adducts, or any combination thereof, in said cell culture;
iii) Optionally labeling the cells and other particulate impurities;
iv) Obtaining FIM images of said cell culture; and
v) Classifying said FIM images.

In some embodiments, the type of cells of step (i) are similar to the type of cells of the cell-based culture sample. In some embodiments, the cell suspension in step (i) is similar to the cell suspension of the cell-based product A skilled artisan will appreciate that the methods disclosed herein are applicable to any type of cell suitable for cell-based products.

In some embodiments, cell culture conditions for inducing necrosis comprise submitting the cells to a stress condition. In some embodiments, a stress condition comprises shaking stress.

In some embodiments, shaking stress comprises agitation at about 185 rpm for about 3 hours, at room temperature.

In some embodiments, a stress condition comprises a freeze-thawing cycle. In some embodiments, a freeze thawing cycle comprises adding a solvent, as for example DMSO, to the cell culture sample to a concentration of 1%, 2.5%, 5% and 10%, then freezing the sample at −18° C. for at least about 3 hours, and then thawing the sample at 37° C. for 2 min.

In some embodiments, a stress condition comprises exposing the cell culture to heat stress. In some embodiments, heat stress comprises exposing the cells to about 55° C. for about 90 min.

In some embodiments, a stress condition comprises incubation with ethanol. In some embodiments, incubation with ethanol comprises adding ethanol to a cell culture sample to a concentration of 10% for 90 min at 37° C.

In some embodiments, a stress condition comprises a combination of two or more of shaking stress, freeze thawing cycle, heat, and ethanol incubation.

In some embodiments, the CNN is trained with images of necrotic cells that were obtained by different methods. For example, a CNN can be trained with images of necrotic cells obtained by incubating a first group of cells at 37° C. for 90 min in 10% ethanol, and also with images of necrotic cells obtained by incubating a second group of cells at 55° C. for 90 min.

In some embodiments, cell culture conditions for inducing apoptosis comprise incubating the cells with a pro-apoptotic reagent. In some embodiments, a pro-apoptotic agent comprises staurosporin at about 1 μM, in which case cells can be incubated for about 3 hours.

In some embodiments, cell culture conditions for inducing adducts comprise incubating cells in presence of Dynabeads in a number ratio of about 1:1 for about 1.5 hours.

In some embodiments, cells used for the training set images are labeled. A skilled artisan would appreciate that a number of markers are available to label the cell phenotypes and/or impurities investigated herein. In some embodiments, assays for determining apoptosis comprise labeling cells with Annexin V, DNA stains, activated caspase detectors, cytoplasmic cytochrome C, glutathione, or a combination thereof. In some embodiments, assays for determining necrosis comprise labeling cells for example with RIPK3 or MLKL. In some embodiments, morphological filters, such as intensity, sigma intensity, convexity, compactness and aspect ratio, may be used to identify live cells, necrotic cells, apoptotic cells, debris, beads, and adducts.

In some embodiments, the images of the training set are obtained by flow-imaging microscopy (FIM). A skilled artisan would appreciate that FIM is a system that allows obtaining microscopy images of liquid samples in a flow. FIM uses an ultra-high-precision computer controlled syringe pump to pull the fluid sample through a flow cell perpendicular to the optical path. The optical system is similar to a microscope, and is used to capture real-time images of the particles in the fluid as they pass through the flow cell.

In some embodiments, a cell image of the training set are classified to a category according to the treatment applied to said cells. For example, all cell images from a cell culture treated with a pro-apoptotic agent will be classified as apoptotic cells. In some embodiments, cell images are manually classified. In some embodiments, cells are classified to a category according to predefined morphological parameters. In some embodiments, morphological parameters are measured by relevant software for analyzing microscopy images. In some embodiments, at least one parameter selected from intensity, sigma intensity, convexity, compactness and aspect ratio is used to assign a cell image to a category. In some embodiments, each cell image is visually analyzed and manually assigned to a category.

In some embodiments, images of viable cells are classified by applying a size filter (10-20 μm) and an aspect ratio filter (0.6-1.0). In some embodiments, classification of images of viable cells is further manually refined by excluding cells with visible apoptotic blebs, as well as with rougher surfaces.

In some embodiments, all images from cells that underwent conditions for apoptosis induction are classified as apoptotic cells. In some embodiments, cell images are classified to the apoptotic cell category by applying a size filter (10-20 μm), which excludes debris and aggregates, and by applying a circularity filter (<0.9), which excludes remaining viable cell images.

In some embodiments, all images from cells that underwent conditions for necrosis induction are classified as necrotic cells. In some embodiments, manually selected images of viable and necrotic cells are filtered according to morphological parameters, such as aspect ratio, circle fit, convexity, sigma intensity and symmetry. For each listed morphological parameter, particles (cells) must have had a value between the $10^{th}$ and $90^{th}$ percentile of the manually selected population (viable or necrotic cell population) in order to be selected for input to the training of the model.

In some embodiments, all images from cells that underwent conditions for forming adducts are classified as adducts cells. In some embodiments, images from adducts are classified based on mean particle intensity values. In some embodiments, separation of single cells from doublet cells, is done based on the aspect ratio parameter.

In some embodiments, images from magnetic beads and adducts are classified according to their low-transparency values. In some embodiments, images of cell or debris are selected according to their highly transparency value. In some embodiments, the image selection is manually double-checked to exclude debris particles.

In some embodiments, the classified images of the training set are obtained by a method basically comprising obtaining a sample of the cell-based product, obtaining FIM images of said sample, and classifying said FIM images by any of the classification methods disclosed herein.

A skilled artisan would appreciate that neural networks can be pre-trained with a general image dataset. In some embodiments, the CNN pretraining comprises a process where the weights of the network are adjusted as to provide a good starting point for training the CNN with the training set. In some embodiments, the CNN pretrained with the ImageNet dataset, which can be downloaded from http://image-net.org.

Image Classification

Following the learning of the categories of interest, the CNN is capable to classify a new image into one of those categories. In some embodiments, the input layer of the CNN is fed with an image obtained from a cell-based product sample, and said image is classified to a category selected from single viable cells, debris, necrotic cells, apoptotic cells, doublet cells, magnetic beads, or adducts. In some embodiments, the CNN output comprises a probability function, said probability function comprising the probabilities of the analyzed image to belong to each category. In some embodiments, the CNN output comprises assigning the analyzed image to a category.

In some embodiments, the methods disclosed herein comprises a step of applying a function to the results provided by the CNN. In some embodiments, said function comprises predicting the number of viable cells and/or of impurities in the product-cell sample. In some embodiments, the methods disclosed herein are part of a quality control process, and can be combined with any other quality control analyses known in the field.

In some embodiments, the methods disclosed herein comprise labeling the images of the training set by using fluorescent markers. A skilled artisan would appreciate that cell markers are available in the art for fluorescently marking viable cells, necrotic cells, and apoptotic cells. Any of these markers can be implemented with the methods disclosed herein.

In some embodiments, a FIM simultaneously obtains a brightfield image and a fluorescent signal of a cell suspension. Subsequently, the fluorescent signal is used to label the brightfield image. In some embodiments, the fluorescent signal indicates whether a cell is viable, apoptotic, or necrotic, and categorizes its brightfield image accordingly, and the brightfield images are labeled accordingly. In some embodiments, said labeled brightfield images are used for training a CNN.

A skilled artisan would appreciate that any cell marker, indicating any cell phenotype can be applied to the methods disclosed herein. Thus, for example, the methods disclosed herein can be used to train a CNN to recognize cells expressing any membranal protein.

EXAMPLES

The following examples are presented in order to more fully illustrate some embodiments of the technology disclosed herein. They should in no way be construed, however, as limiting the scope of the invention.

Example 1—Materials and Methods of Examples 1-12

Unless stated otherwise, the materials and methods described below relate Examples 1-12.

Cells and sample preparation. T-cell leukemia cells (Jurkat, Clone E6-1, ATCC® TIB152™) were provided by Leiden University Medical Centre (LUMC) as frozen 1-mL aliquots at a total cell concentration of $10^7$ cells/mL, and were stored at −140° C. in the freezer before use. The Jurkat cells were formulated in high-glucose RPMI 1640 (RPMI medium; ThermoFisher, Waltham, MA, USA) supplemented with 10% fetal bovine serum (FBS; Life Technologies, Eugene, OR, USA) and 10% dimethyl sulfoxide (DMSO) (Life Technologies). Dynabeads Human T-Activator CD3/CD28 for T Cell Expansion and Activation, and low-protein-binding collection tubes were purchased from ThermoFisher. Sterile 5-mL Eppendorf tubes were purchased from VWR (Ismaning, Germany).

Jurkat cells used in this study as model T cells were thawed and freshly prepared in RPMI medium before analysis. Frozen cell aliquots were thawed at 36° C. and resuspended in ~40 mL of RPMI medium. To remove residual FBS and DMSO, the cell suspension was centrifuged at 300 rcf for 10 min at 20° C. The supernatant was removed, and the pellet was resuspended in 10 mL of RPMI medium, unless otherwise stated. The mean concentration of (live and dead) cells was 477,188±85,914 cells/mL with a mean viability of 81%±9% (n=8) as determined by hemocytometry (described below), unless otherwise stated. Cell-containing samples were measured up to 4 hours post-thawing during which the cell viability was not affected.

Dynabeads were diluted to an intermediate stock concentration of $10^6$ beads/mL (based on the dilution factor of the nominal Dynabead concentration) in RPMI medium and stored at 2-8° C. for up to 1 month. The required volume of the intermediate stock was added to cell samples to reach the desired Dynabead concentrations. The reference concentration of Dynabeads stated in the following examples, is the expected concentration of Dynabeads in the sample derived from dilution calculations and the original bead concentration stated by the manufacturer. It must be noted that the manufacturer does not use FlowCam for quantification of Dynabeads; therefore, a systematic deviation between reference concentrations and measured concentrations should be anticipated.

Hematocytometry. Cell viability and total cell concentration were determined by using a Bright-Line hemocytometer glass (Merck, Darmstadt, Germany) and an Axiostar Plus microscope (Zeiss, Jena, Germany) with 10× magnification (Zeiss). The washed cell suspension was diluted twofold with a sterile-filtered 0.4% Trypan Blue solution (Merck, Darmstadt, Germany). Next, 10 mL of the mixture was placed in the hemocytometer and at least 100 cells were counted (both viable—not stained, and nonviable-stained cells), following the manufacturer's recommendations.

Flow imaging microscopy. For characterization of micron-sized particles, a FlowCam 8100 (Fluid Imaging Technologies, Scarborough, ME, USA) equipped with an 80-mm flow cell and a 10× objective was used. The instrument was operated by using a VisualSpreadsheet software (v4.10.8). Analysis was performed by using a flowrate of 0.18 mL/min, and the detection thresholds were set to 17 for dark pixels and 15 for light pixels. Images were taken with a high-resolution CMOS camera (1920×1200 pixels) at 27 frames/s. In total, a sample volume of 0.5 mL was analyzed with an efficiency of approximately 70% (i.e., the measured sample volume was −0.35 mL). Cleaning steps between sample measurements involved thorough flushing of the flow cell with 2% Hellmanex III and highly purified water. Diameters are reported as equivalent spherical diameter (ESD), and filters were not applied for imaging pre-processing. Samples were measured in triplicate or sextuplicate unless otherwise stated.

Samples measured within this study contained particles of five distinct populations: single cells, doublet cells, Dynabeads, adducts (defined as a combination of at least one bead with at least one cell) and debris (any other cellular and non-cellular types of particles). For reporting the total determined concentration of cells, the counts of single cells, adducts and 2× doublet cells were summed. The determined concentration of Dynabeads in measured samples was derived from the summed counts of Dynabeads and adducts.

Generation of particle images for population discrimination. Establishment of threshold values and training of the CNN was performed on manually selected images (4,000-

4,500) of each population class, which was shown to be sufficient for training the model to reach high classification accuracy (>0.99). To facilitate the selection process for debris and adducts, samples with elevated numbers of the respective particles were generated prior to FlowCam analysis. Samples enriched in particles representing debris were obtained by submitting freshly resuspended (cryoprotectant free) cell suspensions to two freeze-thaw cycles (−140-36° C.). Samples with high numbers of adducts were generated by incubation of cells (500,000 cells/mL) in presence of Dynabeads in a number ratio of 1:1 for 1.5 hours at 37° C. and 5% CO2.

Development of morphological filters for FlowCam. The VisualSpreadsheet software of the FlowCam system outputs 30 morphological parameters for each detected particle within the measured sample. Five of these available parameters—intensity, sigma intensity, convexity, compactness and aspect ratio—were found to have the highest resolving power for particle populations. Values of particle properties for each population class were further clustered into 1-mm sized bins and are presented in box plots (FIG. 1). For the development of threshold values used to assign each particle to its class, an approach as the one reported in Weinbuch D et al. Micro-flow imaging and resonant mass measurement (Archimedes)—complementary methods to quantitatively differentiate protein particles and silicone oil droplets. J Pharm Sci. 2013; 102(7):2152-65. (https://doi.org/10.1002/jps.23552) was used for the discrimination of silicone oil and protein aggregate particles. Briefly, a stepwise approach was followed.

First, Dynabeads and adducts were separated from cells (singlets and doublets) and debris, based on mean particle intensity values. For each size bin of 1 μm, average values of the $10^{th}$ quartile of "low-transparent" particles (Dynabeads and adducts) and of the $90^{th}$ quartile of "highly transparent" particles (cells and debris) were calculated as a function of size. For size regions in which only one population was present, the cutoff threshold was adjusted manually below or above of the $95^{th}$ quartile parameter value. Furthermore, a 4-degree polynomial function was fitted to these points from 3 μm to 35 μm and tested particles of a certain diameter falling above or below the threshold value set were assigned to either group. Second, threshold values for compactness, convexity and sigma intensity were derived in a similar manner, which allowed for separation of adducts from Dynabeads and cells from debris. For separation of single cells and doublet cells, the aspect ratio parameter was applied. Therefore, each tested particle must have fulfilled at least three criteria to be assigned to a specific population class. All particles with a diameter below 3 μm were assigned to the debris population.

Figure 2:
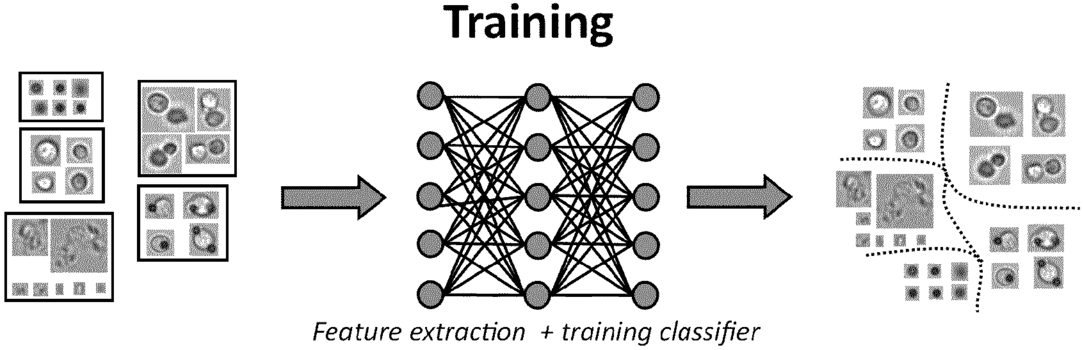
FIG. 2 shows a schematic depiction of the convolutional neural network (CNN) work flow. First, a collection of 4,000 up to 4,500 images from each particle class is manually selected for retraining with the VGG-19 network. During retraining, kernels of weights in the two last layers of the network update weight parameters and extract representative image descriptors based on the input data. Once retraining is completed, the network can be used to predict particle classes of new images. Output is given as a probability of an image assigned to the stated class.
Figure 2:
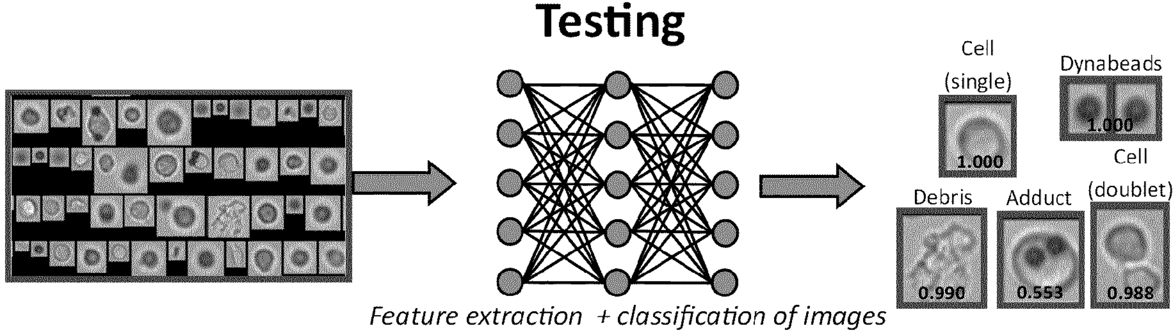

Deep convolutional neural networks. The VGG-19 architecture was used as the foundation for the CNN, as described in Simonyan K et al. Very deep convolutional networks for large-scale image recognition; 2014. http://arxiv.org/pdf/1409.1556v6. This architecture includes 19 convolutional (weight) layers and can capture a large range of visual object features. The network weights are optimized by reformulating convolutional layers as learning residual functions, taking the input to layers as reference. By fine-tuning only, the last two fully connected layers, the feature complexity of the pre-trained model can be optimized for the particle classification task. For fine-tuning the image dataset was split into training, validation and testing sets at a 0.8, 0.1 and 0.1 ratio, respectively. Such division of the dataset was aimed to maintain the classes balanced and so the fine-tuning would not be biased toward a specific class. The deep learning model was fine-tuned with 30 epochs with the Adam optimization algorithm. The machine learning model was implemented in the Keras (2.2.4)-Tensorflow (1.13.1) Python (3.7.3) library and ran on a Nvidia Turing GPU with 11 GB of VRAM. A simplistic workflow for image analysis by using CNN is presented in FIG. 2.

Data analysis. Statistical analysis of data was performed in Origin 2016 (Origin-Lab Corporation, Northampton, MA, USA). Box plots represent the distribution of data where central rectangles span from the first to the third quartile and whiskers range from the $5^{th}$ up to the $95^{th}$ percentile values. For comparison of mean values, a two-sided Student's t-test with a=0.05 (95% confidence interval) was used. The limit of detection (LOD) and limit of quantification (LOQ) were determined by using values of the entire tested range for Dynabeads, where six measurement replicates were performed for each bead concentration. LOD and LOQ were calculated by using Eqs. 1 and 2:

$$LOD=(3{:}3*\sigma)/S \quad (1)$$

$$LOQ=(10*\sigma)/S \quad (2)$$

where σ is the standard error of the y-intercept, and S is the slope of the linear regression line.

Example 2—Protocol for Obtaining High Recovery of Dynabeads

The aim of these experiments was to determine the best protocol for obtaining Dynabeads images for the CNN training.

Methods. The efficacy of the following 3 setups was compared.

Setup 1. Homogenization of Dynabeads in primary package was done as directed by manufacturer. Dilutions and homogenization of beads were performed in polypropylene 2.0-mL microcentrifuge tubes using regular Eppendorf pipette tips. Homogenization of each dilution was performed by vortexing.

Setup 2. Homogenization of Dynabeads in primary package was done as directed by manufacturer. Dilutions and homogenization of beads was performed in polypropylene 2.0-mL microcentrifuge tubes using regular Eppendorf pipette tips. Homogenization of each dilution was performed by a rotator.

Setup 3. Homogenization of Dynabeads in primary package was done as directed by manufacturer. Dilutions of beads was performed with low-protein binding 2.0-mL microcentrifuge tubes and low-retention pipette tips. Homogenization of each dilution was performed by vortexing.

Figure 3:
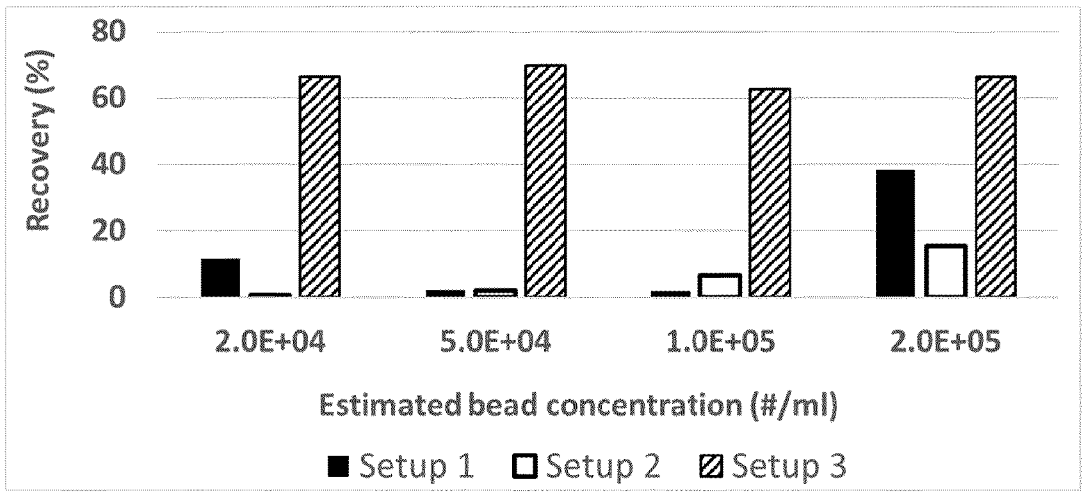
FIG. 3 shows recovery (concentration) of Dynabeads determined by using flow imaging microscopy with respect to Dynabeads theoretical concentration in three different preparation setups.

Results: Setup 3 describes a preparation method of Dynabead suspensions. Dynabeads prepared according to this method could be reproducibly quantified with a recovery exceeding 60% (FIG. 3).

Example 3—Generation of Adduct Images

The aim of these experiments was generating a dataset of adduct images.

Methods. Cells were incubated with Dynabeads in a cell incubator (37° C., 5% $CO_2$) in a ratio of 1:1 for 3 hours. Cells were resuspended by pipetting and quantified by FlowCam method. Images of cells attached to one or more Dynabeads were manually selected by an operator. Adducts produced with different amount of spiked Dynabeads were quantified by FlowCam-CNN.

Figure 4:
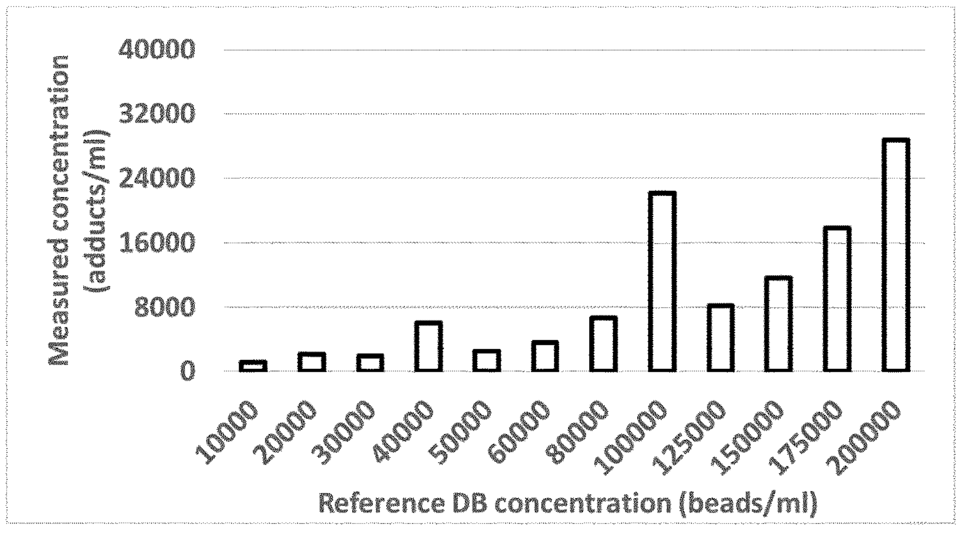
FIG. 4 shows concentrations of adducts as measured by FIM-CNN.

Results. The number of adducts was detected increased with the number of Dynabeads in present in cell suspensions (FIG. 4).

Example 4—Selecting Appropriate Focus for FlowCam Measurements

The aim of these experiments was selecting an appropriate focus for FlowCam measurements. An appropriate focus should allow obtaining images of reproducible quality, and achieving consistent performance of the machine learning model.

Methods. Mean intensity and edge gradient values were used to assist in selecting the most optimal focus settings for capturing cell images. Once focusing settings were established with cells, replicate measurements of polystyrene standard particles were performed (n=9) in order to obtain mean intensity values and edge gradient values for standard suitability test criteria. Performing measurements of polystyrene standard particles and adjusting focus settings to the predefined mean intensity and edge gradient values was required prior to performing measurements of cell suspensions.

Figure 5:
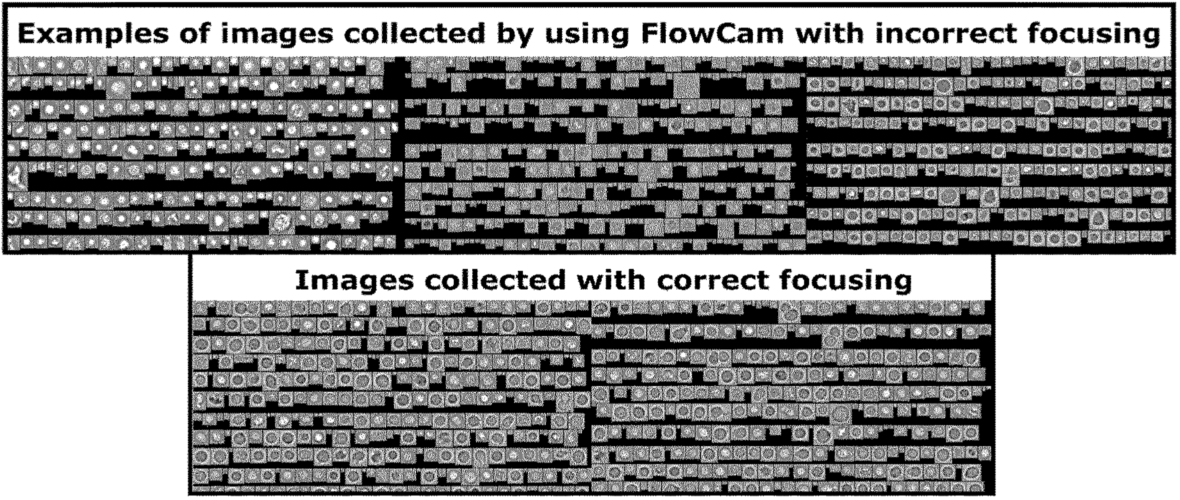
FIG. 5 shows images collected by using FlowCam with incorrect focus settings (top) and correct focus settings (bottom).

Results. Cell images with consistent image quality for classification by using machine learning were collected (FIG. 5). A system suitability test was established, in which polystyrene standard particles are used to test and confirm the correct focus settings (based on mean intensity and edge gradient values).

Example 5—Selection of Images for Training Dataset

The aim of these experiments was selecting images comprising high proportions of viable cells, necrotic cells, and debris particles.

Methods. Establishment of cell treatment methods to induce necrosis. Cells were treated with digitonin (target concentration in RPMI medium: 1 μM, 5 μM, 10 μM), heat (55° C. for 1.5 hours), or ethanol (10% v/v at 37° C. for 1.5 hours).

Morphological criteria were established to curate the training dataset and eliminate "edge cases" in each population. Images taken for training were required to have values of the following morphological parameters: aspect ratio, circle fit, compactness, convexity, elongation, intensity, roughness, sigma intensity, symmetry, transparency, within the 10-90 percentile range of the total selected image population per each class.

Figure 6:
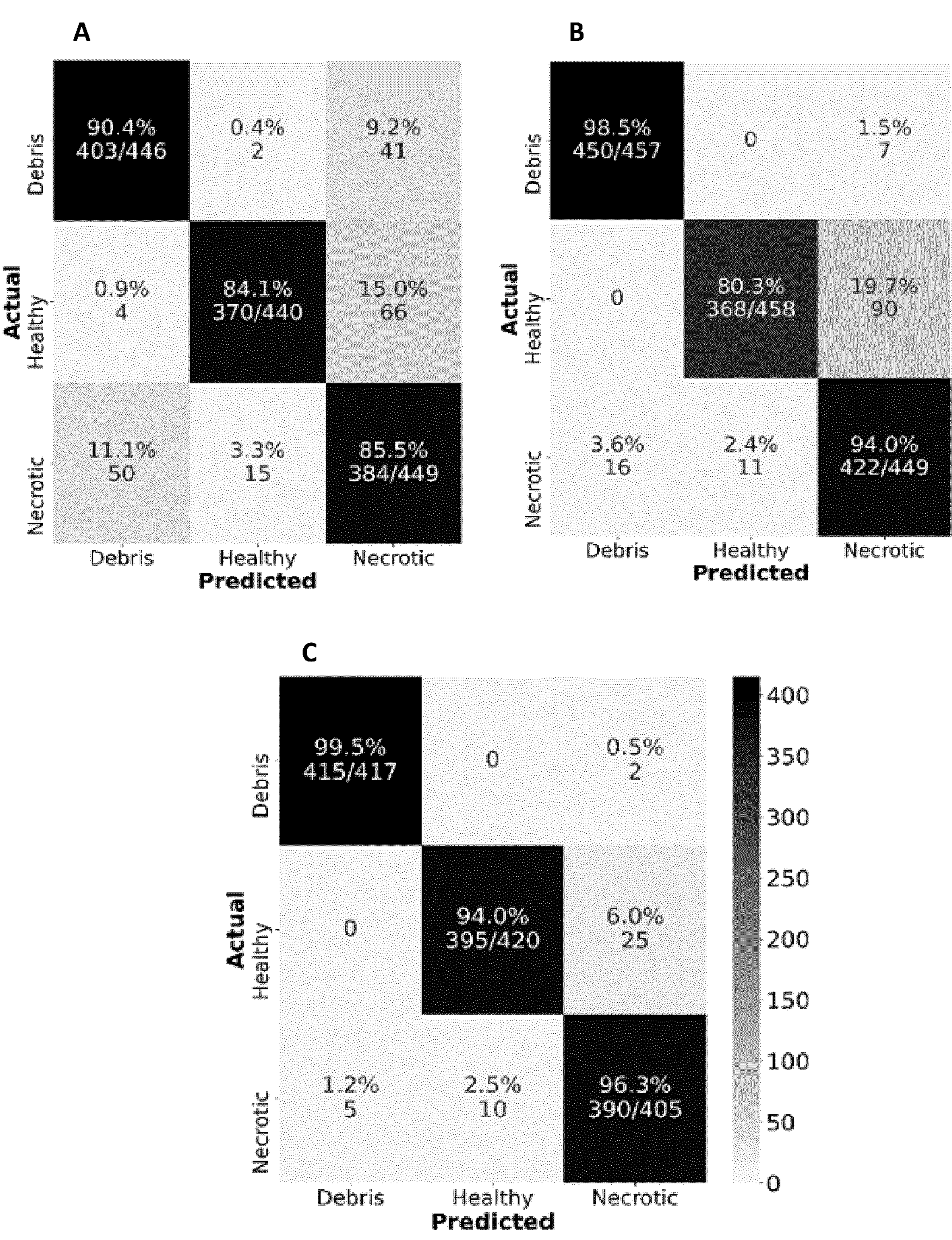
FIG. 6 shows confusion matrices obtained on the training outcome of the machine learning model. The image datasets comprised necrotic cells obtained from digitonin treatment (FIG. 6A), heat and ethanol treatment (FIG. 6B), heat and ethanol treatment+image dataset curation of each class using morphological parameters (FIG. 6C).

Results. Classification accuracy using the trained machine learning model reached >96% (FIGS. 6A-6C).

Example 6—Identification of Particle Populations in Cell Suspensions

Figure 7:
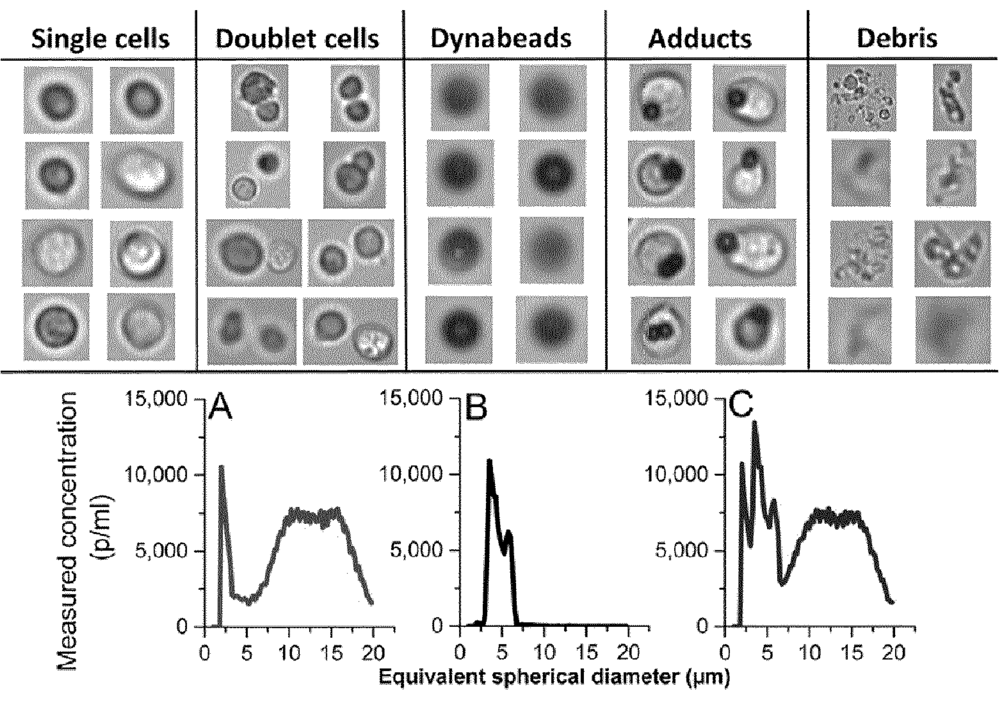
FIGS. 7A-7C show representative images of each population class obtained by using FlowCam. All images were enlarged for presentation purposes.

Analysis of cell suspensions supplemented with Dynabeads was performed by using FlowCam and representative examples of generated images of the five distinct particle populations. Besides single cells, debris and Dynabeads, a noticeable number of images with two captured cells (doublet cells) as well as cells with one or more adjacent Dynabeads (adducts) was observed. Particle size distributions of samples containing cells (without beads), Dynabeads (without cells) and a mixture of cells and Dynabeads are shown in FIGS. 7A-7C. Samples containing cells showed a broad peak between 10 μm and 16 μm, representing the Jurkat cells (FIG. 7A). Furthermore, a sharp peak at the lower size limit of detection was observed and assigned to debris. Dynabeads showed a bimodal peak with maxima at 3.5 μm and 6.0 μm (FIG. 7B). These values represent the measured size of beads from in-focus (sharp) and out-of-focus (blurred) images and are close to the mean bead diameter of 4.5 μm stated by the manufacturer. Particle size distributions of mixtures of Dynabeads and cells looked like a summation of the cells and the beads (FIG. 7C). Although these samples were found to contain adducts (FIG. 7, top panel), which obviously were not present in the other samples, the number of adducts was relatively small and did not substantially affect the overall size distribution.

Example 7—Morphological Parameters for Particle Classification

Figure 8:
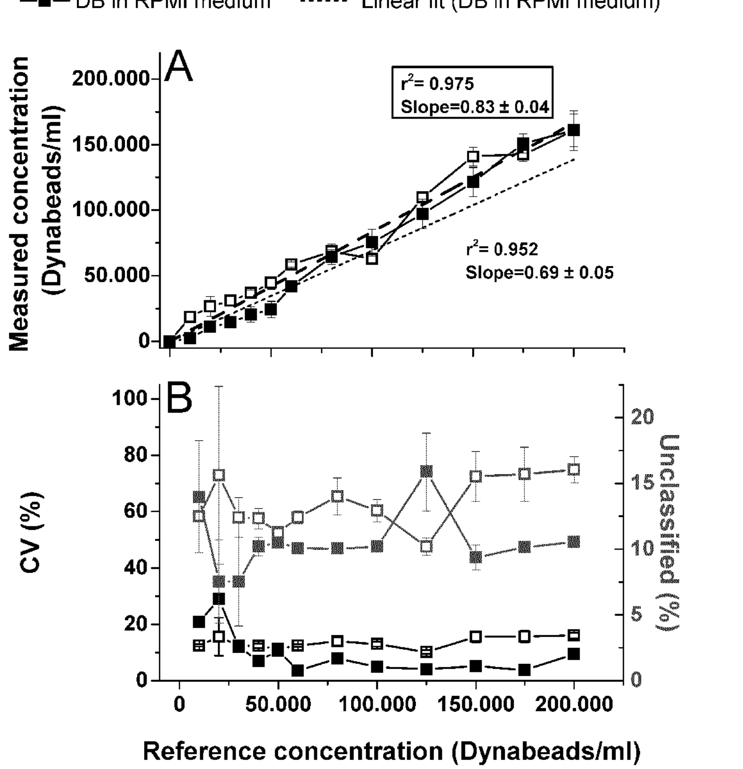
FIGS. 8A-8B show classification of Dynabeads images by using morphological parameters output from the FlowCam software.

For beads suspended in the RPMI medium, a linear relation was found between the measured Dynabead concentration and the expected Dynabead concentration derived from the dilution factor, with a linearity of $R^2$=0.95 (FIG. 8A), based on the selected morphological parameters with the FlowCam software. Measurements of beads in the presence of cells (~500,000 total cells/mL by using a hemocytometer) resulted in a similar linear correlation ($R^2$=0.98). However, unexpectedly high numbers of unclassified particles (i.e., particles with morphological parameters not falling into any of the five classes) were found. The coefficient of variation for measured concentrations of Dynabeads in presence of cells was noticeably higher compared with the control samples. Additionally, the recovery of Dynabeads in cell suspensions at the lowest three reference concentrations was >100%, suggesting a number of debris and other particles were misclassified as Dynabeads (or adducts) when using this approach. Dynabeads suspended in RPMI medium showed recovery rates from 25% (lowest Dynabead concentration) up to 85% (highest Dynabead concentration). Altogether, using the morphological particle parameters output from the FlowCam software resulted in a good correlation between detected concentrations and reference concentrations of Dynabeads. However, the high numbers of unclassified particles and the noticeable variation in determined particle concentrations illustrate the friability of this classification approach.

Example 8—CNN for Particle Classification

Conventional morphological filters failed at accurately discriminating particle populations in cell suspensions. Therefore, convolutional neural networks (CNN) were applied for analysis of raw FlowCam images. The retrained FlowCam-CNN model with the pre-selected datasets, as described in Example 1, was used to classify on average 140,000 images per sample into individual particle classes.

Figure 9:
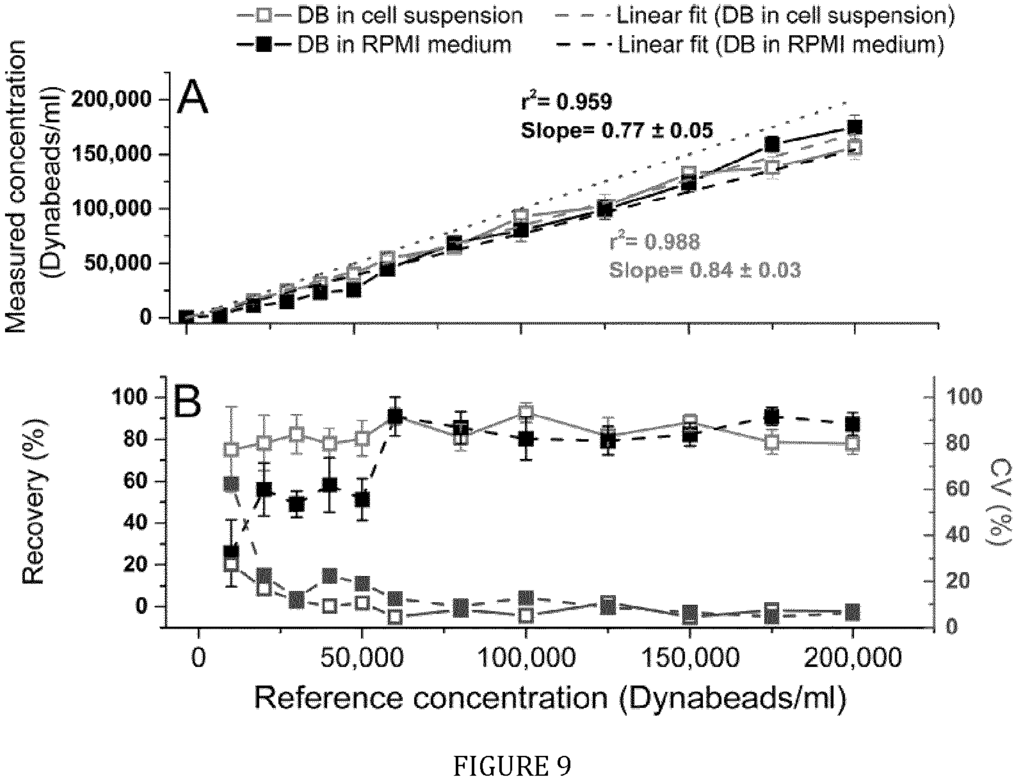
FIGS. 9A-9B show the results of Dynabeads (DB) classification by using CNN.

In contrast to the results based on the morphological particle parameters output, FlowCam-CNN analysis resulted in classification of all particles present cell suspensions (500,000 cell/mL counted by using a hemocytometer) with or without Dynabeads (FIG. 9). Linearity over the entire tested Dynabead concentration range was >0.95 for both sample sets, and slope values were 0.8. Samples containing cells and >50,000 beads/mL had recovery values >80% and a coefficient of variation below 15%. The relative error of the determined bead concentration was apparently random and showed a uniform distribution around 0 for samples with cells, except for the lowest bead concentrations measured. Dynabeads suspended in cell-free RPMI medium at reference concentrations <60,000 beads/mL showed lower recoveries compared with samples containing cells, which exceeded a recovery rate of 75% within the tested range. The coefficient of variation of determined Dynabead concentrations was >10% for samples with <50,000 beads/mL and <10% for the higher tested bead concentrations. Therefore, the optimal Dynabead concentration for quantification of beads by using FlowCam-CNN was determined to be from ~45,000 beads/mL to at least 200,000 beads/mL.

The FlowCam method assisted with automated image classification (FlowCam-CNN) was examined in alignment with the ICH Q2 (R1) guideline for validation of analytical procedures. Accuracy, precision, LOD, LOQ and linear relationship for Dynabeads detection in absence and presence of cells were evaluated and the results are presented in Table 1. For Table 1, the LOD and LOQ were determined for Dynabead concentrations tested in the study and presented in FIG. 9. Accuracy and precision were determined for Dynabead concentrations above the LOQ. Cell concentration was ~375,000 cells/mL.

TABLE 1

Parameters determined by FlowCam-CNN based on mean values of two inter-day triplicate measurements.

| Parameter | Dynabeads (in cell suspension) | Dynabeads (in RPMI 1640 medium) |
|---|---|---|
| Accuracy | 86.9 ± 5.4 | 80.5 ± 12.6 |
| Precision (CV %) | 4.7 ± 0.9 | 8.0 ± 3.2 |
| LOD (beads/mL) | 15,229 | 13,661 |
| LOQ (beads/mL) | 46,149 | 41,396 |
| Linearity ($R^2$) | 0.988 | 0.959 |

The LOD and LOQ were 15,000 and 45,000 beads/mL, respectively, whereas slightly higher values were found for Dynabead suspensions in absence of cells. Accuracy and precision (repeatability) were calculated for Dynabead concentrations above the LOQ, and the values present averages of two intra-day sets of triplicate measurements. Accuracy was determined as the recovery of spiked in Dynabeads with respect to the reference concentrations (Recovery %). Accuracy was found to be substantially lower for beads in absence of cells at reference concentrations <50,000 beads/mL. Above this concentration, the presence of cells did not have an impact on the accuracy of quantification. Furthermore, precision of Dynabeads concentration determination was evaluated as the coefficient of variation (CV %) and overall values were <10%.

Example 9—Characterization of Cellular Particulate Matter

In addition to developing a method for characterization of non-cellular particles, debris (a potential impurity) as well as cells and adducts were quantified.

Figure 10:
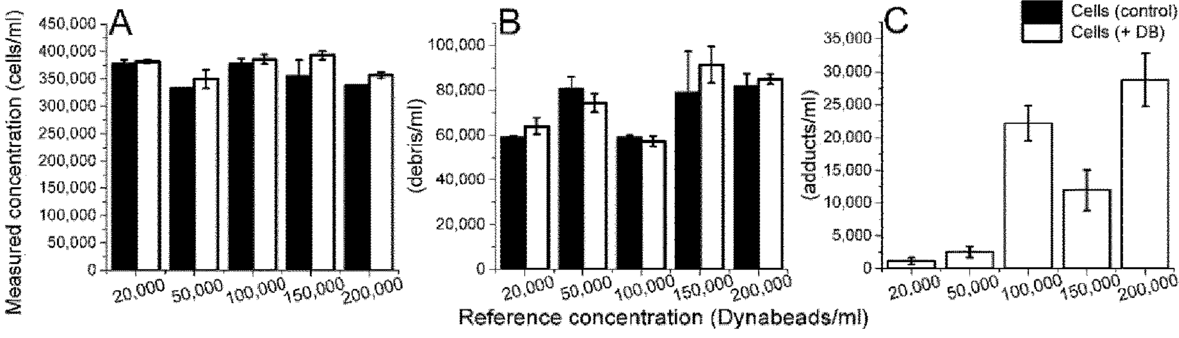
FIGS. 10A-10C show the impact of Dynabeads on the number of total number of cells quantified.

The tested concentrations of Dynabeads in Jurkat cell suspensions (FIG. 9) were studied at a constant cell concentration (385,711±59,337 cells/mL as determined with FlowCam). The presence of Dynabeads did not have a significant impact on the number of quantified total number of cells (t-test, two-sided, P>0.17; FIG. 10A). Moreover, the numbers of detected particles classified as debris in cell samples without and with Dynabeads were highly comparable. Furthermore, the number of detected adducts increased with higher concentrations of beads present in cell samples (FIGS. 10B and 10C).

Example 10—Misclassifications

Figure 11:
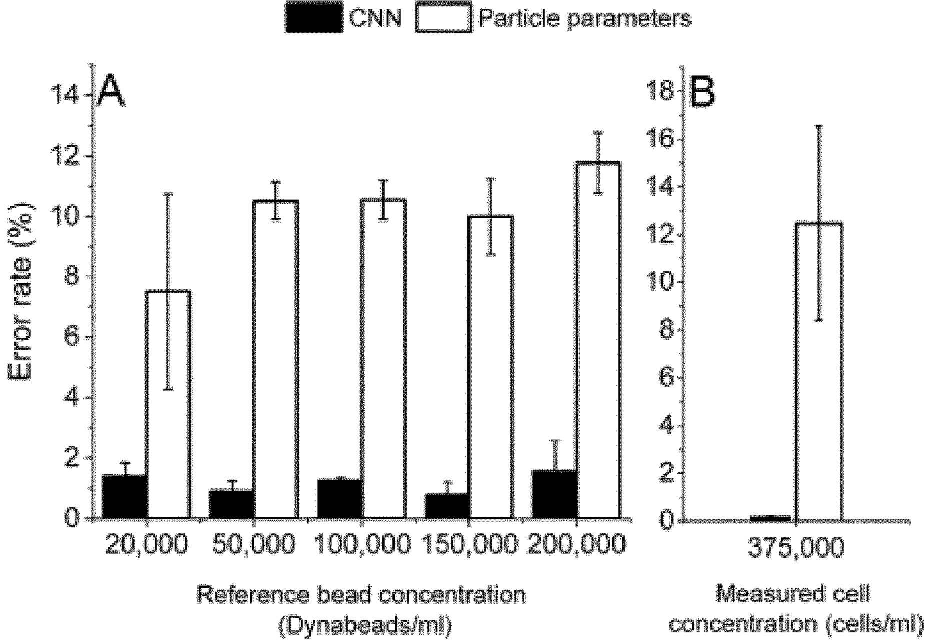
FIGS. 11A-11B show error rates of particles classified as cells or adducts in Dynabead suspensions with different Dynabead target concentrations (FIG. 11A), and Dynabeads and adducts in cell suspensions at 375 000 cells/mL (FIG. 11B), as determined by using FlowCam. Error rates are based on misclassified particles by using CNN (filled bars), and on misclassified and unclassified particles by using particle morphological parameters (empty bars). Error bars are standard deviations of mean values of six replicates.

The misclassification rate was calculated in an indirect manner because of the large number of acquired images per measurement (>100,000 per measurement). Debris particles were present in all measured samples (Dynabeads and cell suspensions); therefore, the misclassification rate for this population was not considered. FIG. 11A represents the rates of erroneously detected cells (singlets, doublets and adducts) and of unclassified particles within Dynabead suspensions of different reference concentrations. FIG. 11B presents the error rates of detected Dynabeads and adducts as well as unclassified particles within cell only suspensions at a cell concentration of 375,000 cells/mL (as measured by FlowCam). In both cases, the misclassification rates were very low (<2%) when the data was processed by using CNN. Furthermore, the error rate was independent of the spiked-in amount of Dynabeads, as the fraction of misclassified particles was similar for each of the tested concentration of beads in cell suspensions. Particles analyzed by using morphological parameters showed a much higher inaccuracy and unclassified fraction, which is reflected by the relatively high error rates (up to 50-fold higher compared to CNN).

Figure 12:
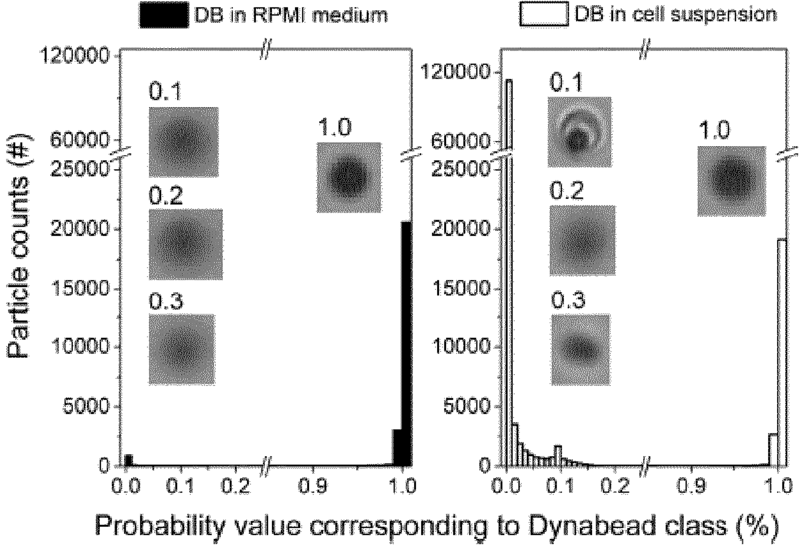
FIG. 12 shows the probability distribution (binned in units of 0.01) of classified particle images determined by FlowCam-CNN for Dynabead suspension (filled) and cell suspension supplemented with Dynabeads (empty) at a concentration of 80,000 beads/mL. Representative images are shown with their assigned probability of belonging to the Dynabead class.

FIG. 12 presents the probability distribution, as determined by deep learning classification, of particle images classified as Dyna-beads. Particle images were collected during FlowCam measurements of Dynabeads (80,000 beads/mL) in presence and absence of cells. In the classification network, the Softmax regression function was integrated, which is an activation function converting calculated weights into probability distributions and rejecting all cases with probabilities <0.2. For the sample with suspended Dynabeads in RPMI medium, the vast majority of images classified to the bead class had a probability equal to 1, which confirmed that the network made the assignment with very high confidence. Moreover, this high confidence was not impacted by the presence of cellular material in the sample, as similar counts of beads with a probability of 1 were found in samples containing Jurkat cells. In conclusion, these data demonstrate that image classification by using FlowCam-CNN is highly accurate.

Example 11—Effect of Cell Concentration on Measurement

Figure 13:
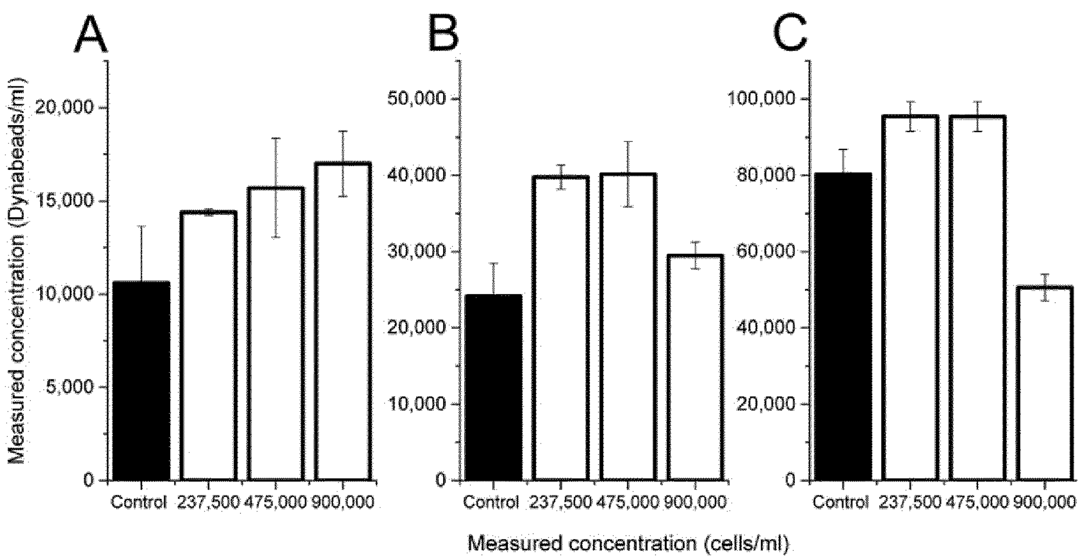
FIGS. 13A-13C show the concentrations of Dynabeads in RPMI medium (control; filled bars) and cell suspensions (empty bars). Three different cell concentrations (x-axis; determined by using hemocytometry) were tested with reference concentrations of Dynabeads of 20,000 (FIG. 13A), 50,000 (FIG. 13B), and 100,000 (FIG. 13C) Dynabeads/mL. Error bars represent standard deviations of triplicate measurements of Dynabeads in cell suspensions and of nonuplet measurements of Dynabeads in RPMI medium.
Figure 14:
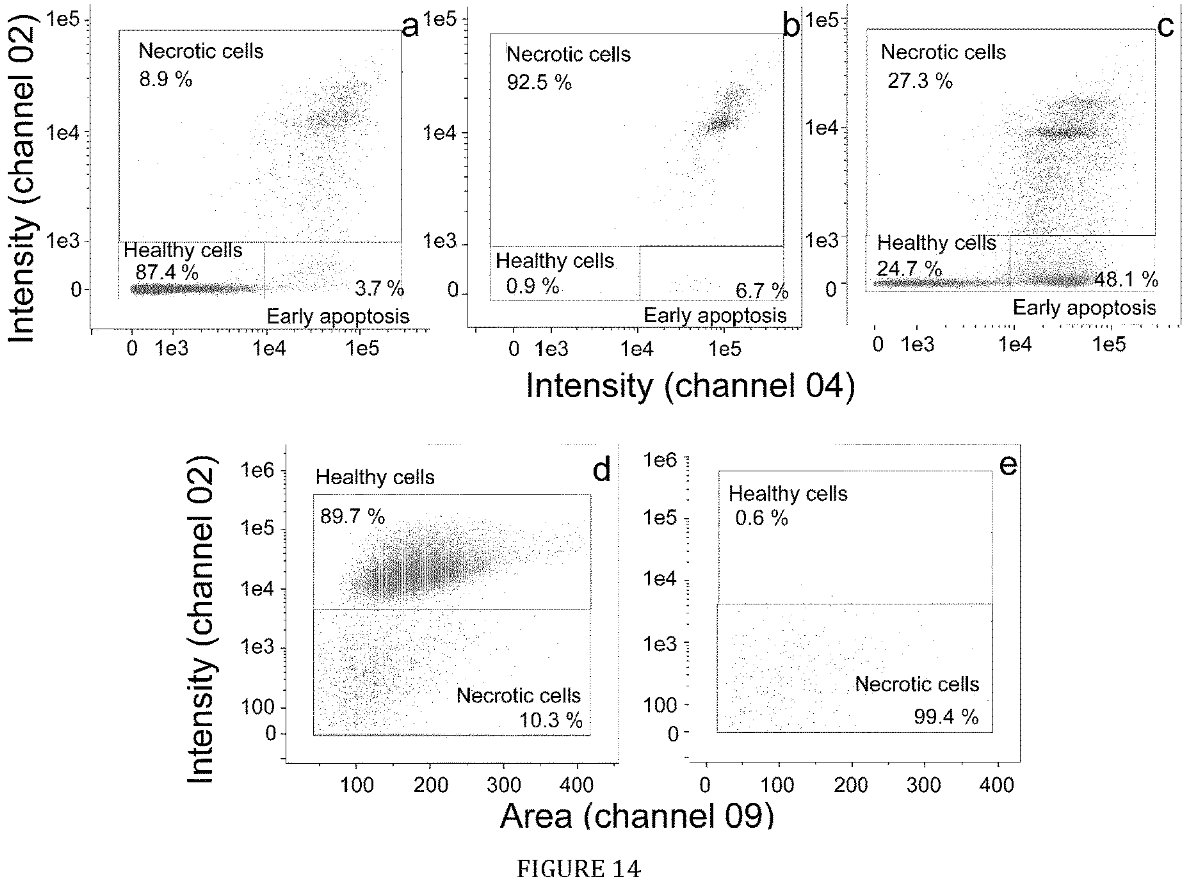
FIGS. 14A-14E show manual gating of freshly thawed cells (FIG. 14A), heat treated cells (FIG. 14B), and camptothecin treated cells measured by using Annexin V-FITC and propidium iodide (PI) assay (FIG. 14C), freshly thawed cells (FIG. 14D), and digitonin treated cells measured by using calcein-AM assay (FIG. 14E).

The impact of the Jurkat cell concentration on the quantification of Dynabeads in cell suspensions by FlowCam-CNN was investigated, and the results are presented in FIG. 13. Dynabeads spiked into samples with cell concentrations up to ~500,000 cells/mL (as determined by using a hemocytometer) resulted in similar measured bead concentrations in presence of cells. At the highest tested cell concentration (900,000 cells/mL), an underestimation of detected beads at reference Dynabead concentrations of 50,000 and 100,000 beads/mL was observed. Such an underestimation was not observed for the lowest tested Dynabead concentration (20,000 beads/mL). Furthermore, control samples showed lower Dynabead recoveries compared with samples with cell suspensions.

Example 12—Summary of Examples 1-11

Characterization of cellular and non-cellular (i.e., foreign) particulate matter in cellular based medical products (CBMPs) is important to guarantee a safe product of good quality. Additionally, with the limited time available for analytical testing of some cell products, straightforward, rapid and comprehensive methods are urgently needed.

In this study a model system containing Jurkat cells, serving as a surrogate for T cells, such as CAR-T cells, and Dynabeads CD3/CD28 was used, serving as a representative potential process-related particulate impurity in CAR-T cell products. These super-paramagnetic beads coupled to CD3 and CD28 monoclonal antibodies are used in the production of CBMPs. However, their removal before the final formulation step remains difficult More important, taking into consideration reports on the potential toxicity of Dynabeads, methods showing effective and consistent removal of these impurities in the manufacturing process are required. Therefore, in this study, the feasibility of FIM for the discrimination of Dynabeads and cells, and for the assessment of the Dynabead concentration was assessed. It was hypothesized this should be possible because Dynabeads differ in size and morphological properties from T cells.

The FIM-based method may offer advantages for characterizing CBMPs because it is a high-throughput technique capable of rapid measurements of high sample numbers without laborious preparative steps. The two most commonly used FIM systems are FlowCam and Micro-Flow Imaging (MFI). A downside of the FlowCam technique can be the relatively inaccurate particle sizing, resulting from a narrow depth of focus within the field of the imaging system. As a result, particles of a homogenous diameter may show a bimodal distribution, which was also observed in the present study. Unexpectedly, accurate sizing was not of key importance for the accuracy of the present system. However, in-focus and out-of-focus images should both be assigned to the same particle class, implying an increase in complexity of the classification process.

The verification of viability and total concentration of cells used in the study was performed by using a hemocytometer. Cell concentrations determined by using FlowCam were lower compared with manual counting, and the difference was ~20%. Furthermore, the concentration of Dynabeads detected by FlowCam deviated from the reference concentrations stated by the manufacturer, that is, the recovery was always <100% especially for Dynabeads at lower concentrations. This, however, can most likely be ascribed to a loss of beads during sample preparation, as measurements with a Multisizer 4e Coulter-Counter analyzer (method used by the manufacturer for quantification) showed similar results. Moreover, preliminary studies showed a significant impact of used lab disposables (e.g., low-protein binding materials, volume-to-surface ratios) on the determined concentration of Dynabeads. The high affinity of the antibody coated beads to surfaces resulted most probably to adherence of Dynabeads to polypropylene tubes and tips used for sample handling. Interestingly, a more consistent and higher recovery rate was observed for Dynabeads in presence of cells compared to Dynabeads in cell-free RPMI buffer (control) over the measured concentration range. In particular, a pronounced loss of beads at low concentrations (<60 000 beads/mL) was observed in the cell-free control samples, resulting in a recovery below 50%. Such high losses of Dynabeads were not observed in the cell-containing samples, in which most likely debris and other cell-related materials occupied free surfaces and competitively decreased bead adsorption. Because the bead-to-T-cell ratio is critical for T-cell activation or purification, bead-preparative steps where dilutions in cell-free media are involved should be carefully considered to reach the desired bead concentration and assure a consistent manufacturing process.

When using FIM, a capable demarcation approach is required for accurate quantification of specific particle populations found within highly heterogeneous samples. Output parameters by the instruments' operating software can be helpful in discriminating particles based on morphology but may be prone to high error rates. The uniformity of Dynabead images resulted in similar values of each particle parameter and developed filters had close to no misclassifications and 5% of unclassified particles for Dynabead-only samples. However, the morphological nature of cells, cell aggregates and debris is highly heterogeneous and the distribution of each of these particle parameters was highly disperse (FIG. 1). Furthermore, adducts and cells had in many cases interchangeable values for most particle parameters. The error rates (misclassifications and unclassified particles) for images containing only cells were approximately 20% with datasets used for developing morphological filters. Error rates for cell and Dynabead suspensions were ~10% with testing datasets. The lack of a high capability in discrimination of different particle population groups by using morphological parameters was one the main motivations to use an automated image classification method based on CNN.

The high performance of neural networks is in most cases based on large datasets to train the networks. For successful training of an entire CNN, such as VGG-19, several million labeled images per class are required. Although FIM techniques are well suited for applications where comparably large numbers of images can be collected within a relatively short period of time and with low sample consumption, cleaning and labeling a high-quality training dataset remains a challenge. Because the pre-trained VGG-19 was able to efficiently differentiate features on the ImageNet dataset, fine-tuning of the last two fully connected layers by using a relatively small number of labeled FlowCam images resulted in a powerful CNN for differentiation and quantification of Dynabeads. The misclassification rate was significantly reduced with the CNN and was only 0.2% for cell samples spiked with Dynabeads. FlowCam-CNN was capable of quantifying a wide concentration range of Dynabeads in cell suspensions, demonstrating a large dynamic range. Furthermore, the high precision (CV %<5%) in determination of Dynabead concentration in cell suspensions above the LOQ presents this method as a robust approach for quantification of process-related particulates.

The determined total cell and debris concentration was not affected by the number of Dynabeads spiked into the suspension. As expected, the number of detected adducts increased with increasing concentration of Dynabeads in the sample because of the higher probability of beads interacting with cells. Furthermore, a concentration of 500,000 cells/mL showed to have no impact on the quantification of Dynabeads in cell suspensions. However, at the highest cell concentration tested, a clear decrease in recovery of Dynabeads, which were spiked to a target concentration 50,000 and 100,000 beads/mL was observed. This loss in recovery was not observed for the lowest Dynabead concentration of 20,000 beads/mL. A possible explanation could be the approach for counting Dynabead(s) attached to a single cell. Cases in which a particle was classified as "adduct" were considered to consist of a single cell and a single Dynabead, which was true in the majority of cases. However, with increasing number of cells or Dynabeads, the probability of capturing a cell with two or more adhering Dynabeads per image becomes higher. Therefore, the underestimation of Dynabeads could have been related to the inaccurate counting of beads in dense cell populations.

The preceding examples teach a reliable method based on FIM coupled with CNN for detection, characterization and quantification of relevant particulate impurities. They show that small amounts of Dynabeads can be detected in cell suspensions and a high precision in counting is achieved if the bead concentration is above the determined LOQ. Moreover, cells and cellular impurities, such as cell aggregates and adducts, can be also classified by using CNN. Quantification of these particles can assist in monitoring manufacturing processes of CBMPs and assist in process and product characterization, such as stability testing.

Example 13—Materials and Methods of Examples 14-18

Unless stated otherwise, the materials and methods described below relate Examples 14-18.

Cells and sample preparation. T-cell leukemia cells (Jurkat, Clone E6-1, ATCC® TIB152™) were donated by Leiden University Medical Centre (LUMC) as frozen 1-mL aliquots at a total cell concentration of $1\times10^7$ cells/mL (cells counted using NucleoCounter3000 [Chemometec]), and were stored at −145° C. prior to usage. Jurkat cells were formulated in high-glucose RPMI 1640 (RPMI medium; ThermoFisher, Waltham, USA) supplemented with 10% (v/v) fetal bovine serum (FBS; Life Technologies, USA) and 10% (v/v) dimethyl sulfoxide (DMSO) (Life Technologies, Carlsbad, USA). For washing and dilution steps RPMI medium, 1× phosphate buffered saline (Gibco™, pH, 7.4; ThermoFisher, Waltham, USA) or fetal bovine serum stain buffer (FisherScientific, New Hampshire, USA) was used. FBS (heat inactivated, sterile-filtered) and DMSO (suitable for hybridoma, ≥99.7%) were purchased from Sigma-Aldrich (St. Louis, USA). Dead Cell Apoptosis Kit (Annexin V, fluorescein isothiocyanate [FITC] and propidium iodide [PI]), calcein AM dye and CyQUANT™ LDH kit were purchased from (ThermoFisher, Waltham, USA).

Forced degradation studies. Jurkat cells were exposed to three types of forced degradation studies, as described below. Each of the three types of stress conditions were carried out in duplicate on different days. The stressed samples were characterized by using orthogonal methods for evaluation of the quality of cell suspensions.

Thawing stress. Single 1-ml frozen cell aliquots were transferred from storage at −145° C. on dry ice to a water bath (GFL, Burgwedel, Germany) for thawing at 37° C. for 1 min 30 sec (the default thawing condition). For investigation of other thawing temperatures, cells were also thawed in a water bath at 25° C. for 2 min 40 sec and at 5° C. for 4 min 25 sec. Thawing in the water bath was performed to solely dissolve the ice adhering to the walls of the cryovials. Further, the 1 ml aliquot of the partially frozen cell suspension was transferred into 40 mL of RPMI medium equilibrated to the thawing temperature, where the remaining of the ice nucleus dissolved within seconds. The cell suspension was centrifuged at 350×g for 10 min at 20° C. after which the supernatant was discarded, and the pellet was resuspended in 5 ml of RPMI medium. Total cell concentration and viability were assessed by using a CASY counter (Bremen, Germany) and dilution to $1\times10^6$ cells/ml was performed by addition of the required volume of RPMI medium (containing DMSO or FBS where stated). Thus, Jurkat cell suspensions were submitted to thawing at three defined temperatures.

Freeze-thaw stress. DMSO, cooled on wet ice, was slowly added to cell suspensions (placed on wet ice) to reach a target concentration 1%, 2.5%, 5% and 10% (v/v) at a cell concentration of $1\times10^6$ cells/ml. Further, five 1-ml aliquots were prepared in 1.8-ml Nalgene cryovials, which were submitted to freezing at −18° C. for 3 hours. This amount of time was sufficient for complete freezing of the aliquots. Prior to analysis, the samples were thawed for 2 min at 37° C., pooled and washed with fresh RPMI medium. Control samples were stored at 20° C. for 3 hours and were otherwise treated identically as the freeze-thawed samples.

Shaking stress. Cells at a concentration of $1\times10^6$ cells/ml (without or with FBS at 10% [v/v]) were filled (1 ml) into five Nalgene cryovials (ThermoScientific, Waltham, USA) with a 1.8 ml volume capacity. The cryovials were submitted to shaking by constant horizontal agitation at 185 rpm at 25° C. by using an IC 4000 shaker (IKA, Germany). Analysis of cell suspensions of pooled cell aliquots was performed following 3 hours of shaking. Control samples were stored statically and protected from light at 25° C. in cryovials, and subsequently pooled.

Flow imaging microscopy (FlowCam, FIM). Cells (viable and necrotic) and debris particles were quantified by using a FlowCam 8100 (Fluid Imaging Technologies, Scarborough, USA) equipped with a 50-μflow cell. The objective used resulted in a 20× magnification and sample imaging was performed by a high-resolution CMOS camera (1920×1200 pixels) at 27 frames per second. In total, a sample volume of 140 μL was measured with an efficiency of approximately 63% (i.e., the imaged sample volume was ca. 87 μL). Particles imaged within the flow cell were detected with intensity thresholds of 12 for light and dark pixels. Cleaning steps between sample measurements involved thorough flushing of the flow cell with Terg-a-zyme® enzyme detergent (1% [w/v]) and highly purified water. Collected images were not sorted by using any morphological filters and samples were measured in triplicate, unless otherwise stated.

Image analysis using convolutional neural networks. Particle images captured by using FlowCam were analyzed by using convolutional neural networks (CNN). The CNN was based on the VGG-19 architecture described in Example 1. Briefly, the VGG-19 network using rectified linear unit activation functions, punctuated with max-pooling and dropout layers, was pre-trained on the ImageNet dataset (http://image-netorg). The re-training of the network was performed with the first ten layers frozen in order to save computation time and improve accuracy of the model by preserving its pre-learned feature recognition capabilities. For fine-tuning the dataset was split into an 8:1:1 ratio for training, validation and testing, respectively. The model was optimized by running 19 epochs with a SGD optimization algorithm and a 0.001 learning rate. The machine learning model was performed by using Keras (2.2.4), Tensorflow (1.13.1) Python (3.7.3) libraries and ran on a Nvidia Turing GPU with 11 GB of VRAM.

Generation of particle images for population discrimination. The CNN was retrained on manually labelled images (4,000-4,500) of each of the three populations: viable cells, necrotic cells and debris particles. Images of viable cells were manually selected from measured samples consisting of Jurkat cells with a viability of 86.8% (based on PI assay). For selection of necrotic cells, two separate methods were used to induce cell necrosis. Firstly, FlowCam images of cell suspensions treated by heat (55° C. for 90 min) were collected, which showed a viability of 7.6% (based on PI assay). Secondly, cells were imaged after incubation with ethanol (10% (v/v)) for 90 min at 37° C. and had a determined viability of 12.8% (based on PI assay). In order to further define image populations of viable and necrotic cells for the network fine-tuning, morphological parameters, such as aspect ratio, circle fit, convexity, sigma intensity and symmetry, of the two populations were used. Only particles (cells) of morphological parameter values falling between the $10^{th}$ and $90^{th}$ percentile of the manually selected population as viable and necrotic cells were taken for input to the training of the model. Images of debris particles were manually selected from measured suspensions of cells submitted to vortexing for approximately 2 min or two freeze-thaw cycles (−140° C.-37° C.).

Automated cell counting: A CASY TTC 150 (Omni Life Science, Bremen, Germany) cell counter equipped with a 150-μm capillary was used for automated cell counting. Cells were diluted 100-fold in CASYton (Omni Life Science, Bremen, Germany) shortly before analysis. Samples were measured in duplicate and each measurement consisted of 5 sub-runs of 400 μL, resulting in more than 5,000 events counted per analysis.

Imaging flow cytometry. To assess cell viability based on cell metabolism, imaging flow cytometry was used in combination with the membrane-permeable dye calcein-AM (calcein-AM assay), at a final concentration of 6.3 nM in the sample to be analyzed. After dye addition, cells were incubated at room temperature for 30 minutes (in the dark) and further washed with 200 μl of stain buffer (with FBS; BD Bioscience, New Jersey, USA). Subsequently, samples were analyzed by using an Amnis FlowSight imaging flow cytometer (Luminex, Seattle, USA) and data was analyzed using IDEAS 6.2.183 (Luminex, Seattle, USA) image analysis software. Sample measurements were carried out by using a 20× magnification objective in medium-sensitivity mode (132 mm/sec). The side scatter laser was set to 10 mW and the 488 nm fluorescence excitation laser was set to 12 mW. Images of the calcein-AM stained cells were recorded in channel 02 (532/55 nm). Brightfield acquisition was set to channel 9 (582/25 nm) with automatically set intensities. Only particles with a Gradient RMS>30 were collected as true events. Appropriate morphological filters were applied to discriminate between cells and debris particles, in order to assess cell viability on the cell population only. Cell viability was calculated based on the proportion of viable cells from the total population (FIGS. 14A-14E). Each measurement was performed in duplicate.

Cell apoptosis and necrosis were determined by imaging flow cytometry after labelling of the cells with FITC and PI. Sample preparation was carried out according to the Dead Cell Apoptosis Kit instructions. After incubation for 15 min in the dark at room temperature samples were kept on wet ice until analysis. After adjusting the excitation power of the FlowSight imaging flow cytometer to 4 mW, the same instrument settings as described in for the calcein-AM assay above was used. Brightfield as well as fluorescence images in channels 02 (532/55 nm) for FITC and channel 4 (610/30 nm) for PI were recorded. Appropriate morphological filters based on mean intensity, area, aspect ratio and modulation from channel 09 were applied to discriminate between single cells and cell aggregates or debris particles. Once single cells were selected based on brightfield images, mean intensity values from channel 02 (fluorescence) were plotted against the particle area (erode mask) where the positively stained cells were classified as viable. Cell viability was calculated based on the proportion of viable cells from the total population shown in FIGS. 14A-14E.

Lactate dehydrogenase release assay. Cell membrane integrity was assessed by using a lactate dehydrogenase (LDH) release assay (CyQUANT; ThermoFisher, Waltham, USA). Loss of cell integrity was measured based on the level of LDH released upon damage to the plasma membrane. The assay is based on the conversion of lactate to pyruvate in presence of LDH with parallel formation of NADH+. Absorbance measurements were performed by using a Tecan Spark plate reader (Tecan, Mannedorf, Switzerland) at 490 nm with reference absorbance of 680 nm. The total cell concentration was adjusted to ca. 150,000 cells/mL with RPMI medium (cell concentration to be within the linear range for this assay (data not shown)). Cells were incubated at 37° C. and 5% $CO_2$ for 45 min (with spiked water or Triton X-100) before the assay was carried out according to the manufacturer's protocol. Release of the amount of LDH in the medium was calculated according to Eq. 3:

$$\text{LDH release (\%)} = \left(\frac{\text{Spontanous LDH activity}}{\text{Maximum LDH activity}}\right) * 100 \quad \text{(Eq. 3)}$$

Spontaneous LDH activity was based on measurements of cell suspensions spiked with water and maximum LDH activity values were derived from cell suspensions spiked with Triton X-100 to a target concentration of 10% (v/v). The results for each sample are based on measurements of four replicate wells.

Figure 15:
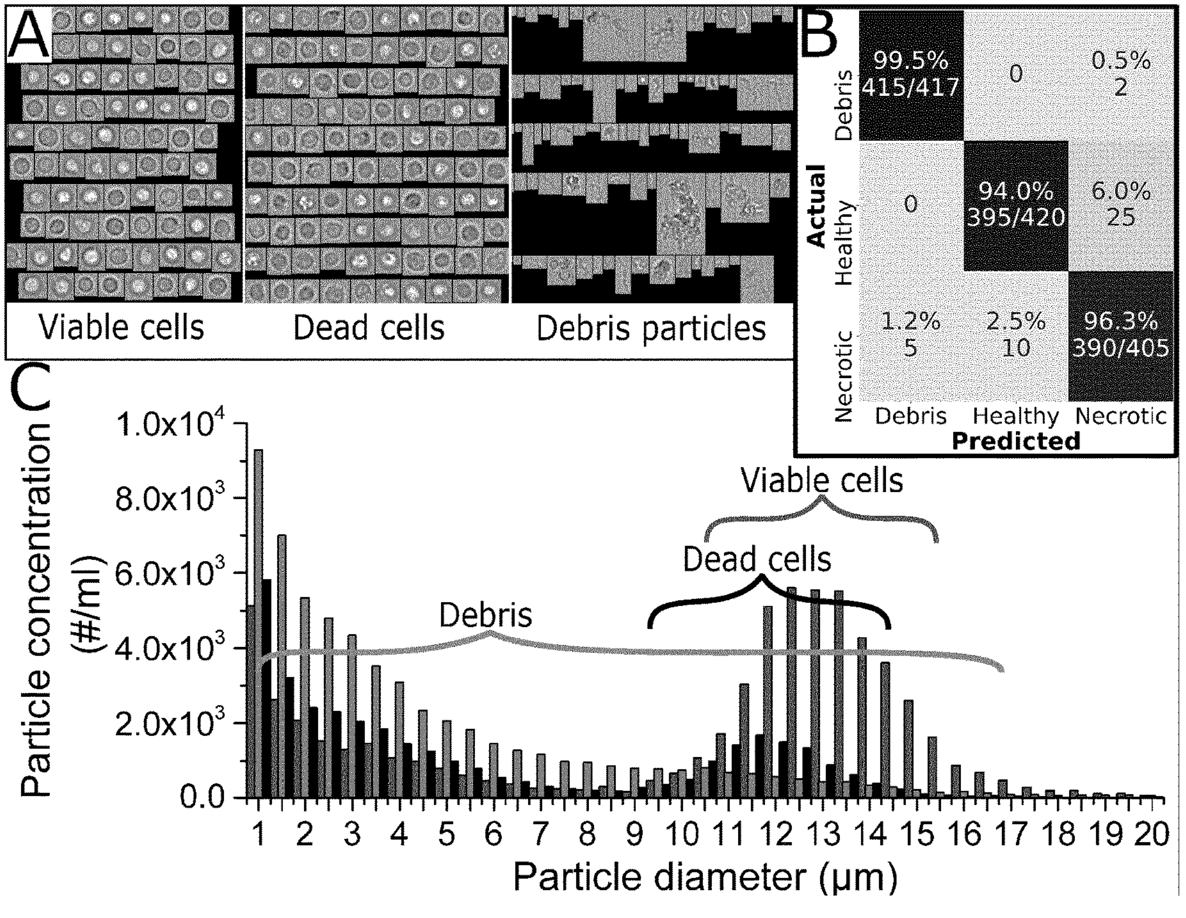
FIGS. 15A-15C show exemplary FlowCam images selected for training of the CNN model (FIG. 15A); the confusion matrix obtained from cross-validation analysis on image datasets not used during model training (FIG. 15B); and the particle size distribution of cell suspensions vortexed (enriched in debris particles), heat treated (enriched in necrotic cells) and freshly thawed (viable cells) determined by using FlowCam (FIG. 15C).

Example 14—FIM-CNN for Measurement of Cell Counts, Cell Viability and Debris Particle Concentration FlowCam images of viable and necrotic cells as well as debris particles (FIG. 15A) were used to train a CNN for image classification. The recall value (proportion of positive identifications of all true positives present in the population) for classification of debris particles with the model was 99.5%, proving a high confidence of this classification approach (FIG. 15B). Similar recall values were achieved for the viable and necrotic cell populations (94.0% and 96.6%, respectively). For evaluation of the classification model performance, the F1 score is an additional metric used to assess the weighted average of the precision and recall. Here, the F1 score for debris, viable cells and necrotic cells was determined to be 0.991, 0.933 and 0.919, respectively. Such high values confirm the low number of incorrectly classified images during the testing phase of the network's retraining. Therefore, FIM-CNN is presented in this study as a novel method for determination of the concentration of viable and necrotic cells, as well as for quantification of debris particles with a heterogeneous size distribution (FIG. 15C).

Example 15—Effect of Thawing Temperature

Figure 16:
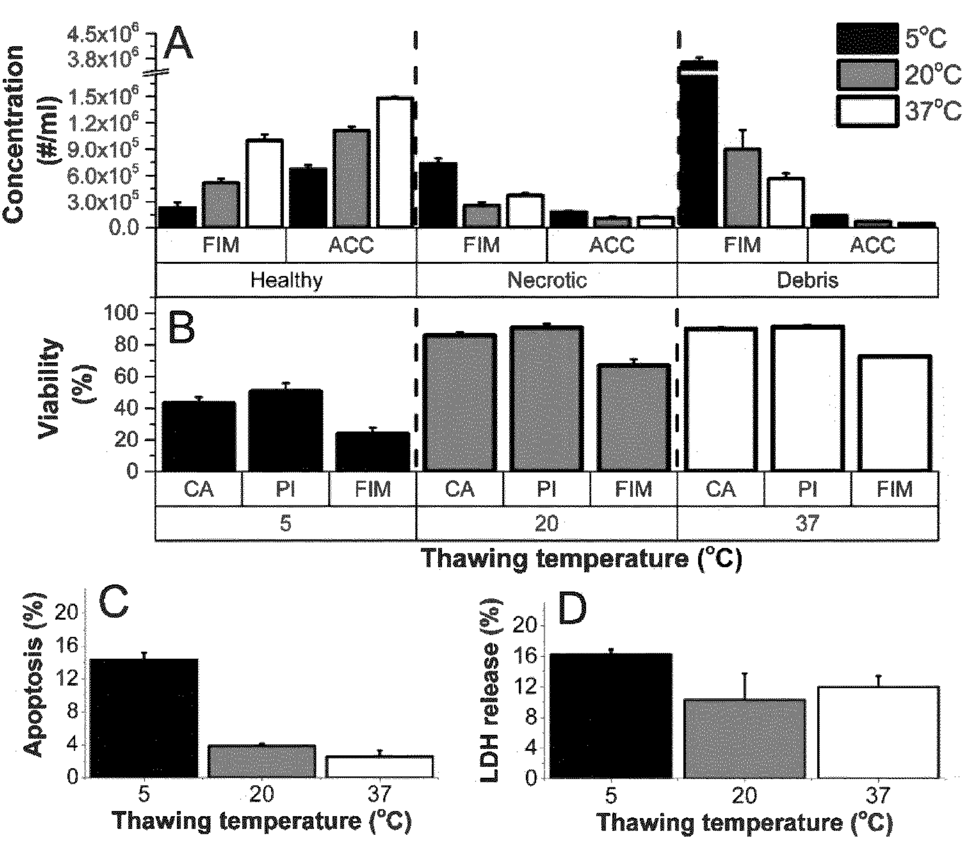
FIGS. 16A-16D show measurements of cell aliquots after thawing at 5° C., 25° C. and 37° C.
Figure 17:
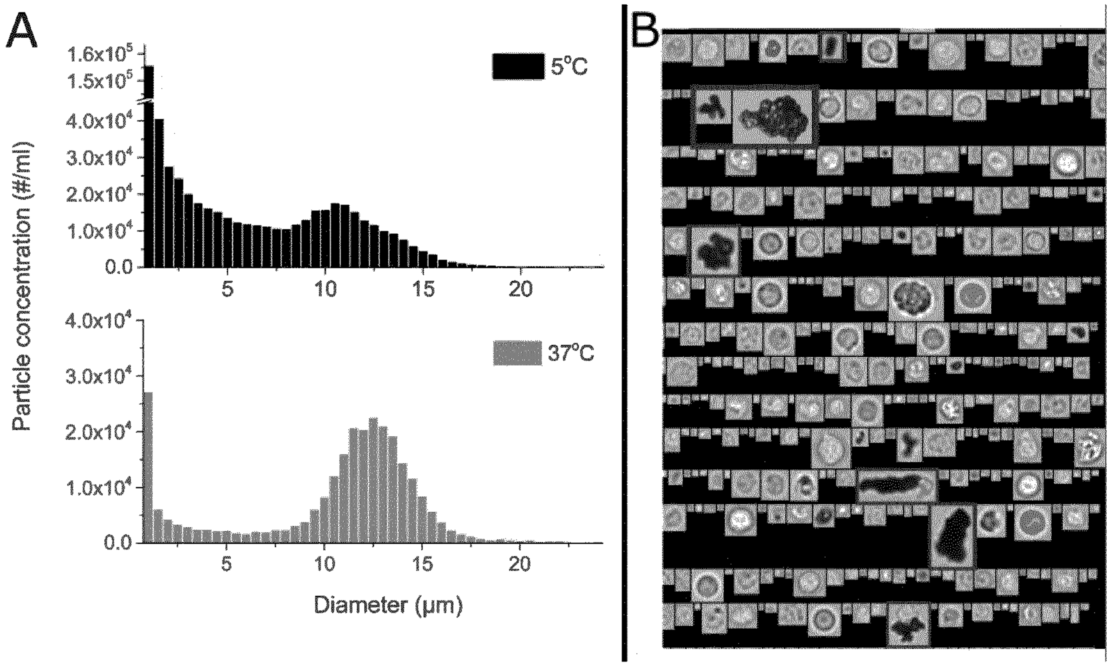
FIGS. 17A-17B show the effect of thawing on size distribution of Jurkat cells.

Frozen Jurkat cell suspensions were thawed at 5° C., 25° C. and 37° C. to evaluate the impact of thawing temperature on cell quality (FIG. 16A). FIM-CNN and automated cell counting showed an increase in recovery of viable cells with increasing thawing temperatures. Comparable concentrations of viable cells were obtained from both methods; however, the counts for necrotic cells and debris particles differed substantially. FIM-CNN measured a higher number of necrotic cells in samples thawed at 5° C., as well as an increasing concentration of debris particles with decreasing thawing temperature. At the lowest tested thawing temperature of 5° C., cell suspensions contained over $4\times10^6$ debris particles/mL, including dark and dense particles which were not observed in cell suspensions thawed at 37° C. and 20° C. (FIGS. 17A-17B).

High cell viability was recorded for aliquots thawed at 37° C. and 20° C. (FIG. 17B). The two fluorescence-based methods showed a viability between 86% and 91%, whereas with FIM-CNN values were between 63% and 71%. However, a clear decrease in cell viability to 43%, 50% and 22% was observed for aliquots thawed at 5° C. according to the calcein-AM, PI and FIM-CNN assays, respectively. For all three thawing temperatures, there was a discrepancy in the absolute values of determined cell viability, when comparing the two fluorescence-based assays and FIM-CNN.

The Annexin V-FITC assay suggests that cells are more likely to undergo apoptosis when thawed at lower temperatures (FIG. 16C). In particular, a marked increase in apoptotic cells can be observed in cell suspensions thawed at 5° C. A similar trend was observed with the LDH release assay, albeit less pronounced (FIG. 16D).

Example 16—Effect of Freeze-Thawing

Jurkat cells formulated in RPMI medium and DMSO (0%, 1%, 2.5%, 5% and 10% [v/v]) were submitted to one freeze-thaw cycle, which included storage of the cell suspensions at −18° C. for three hours and 2 min of thawing at 37° C. Freeze-thawing of cell suspensions with 0% and 1% (v/v) DMSO led to a reduction of cell counts by >98%, indicating that under these conditions practically all cells lose their viability (data not shown).

Figure 18:
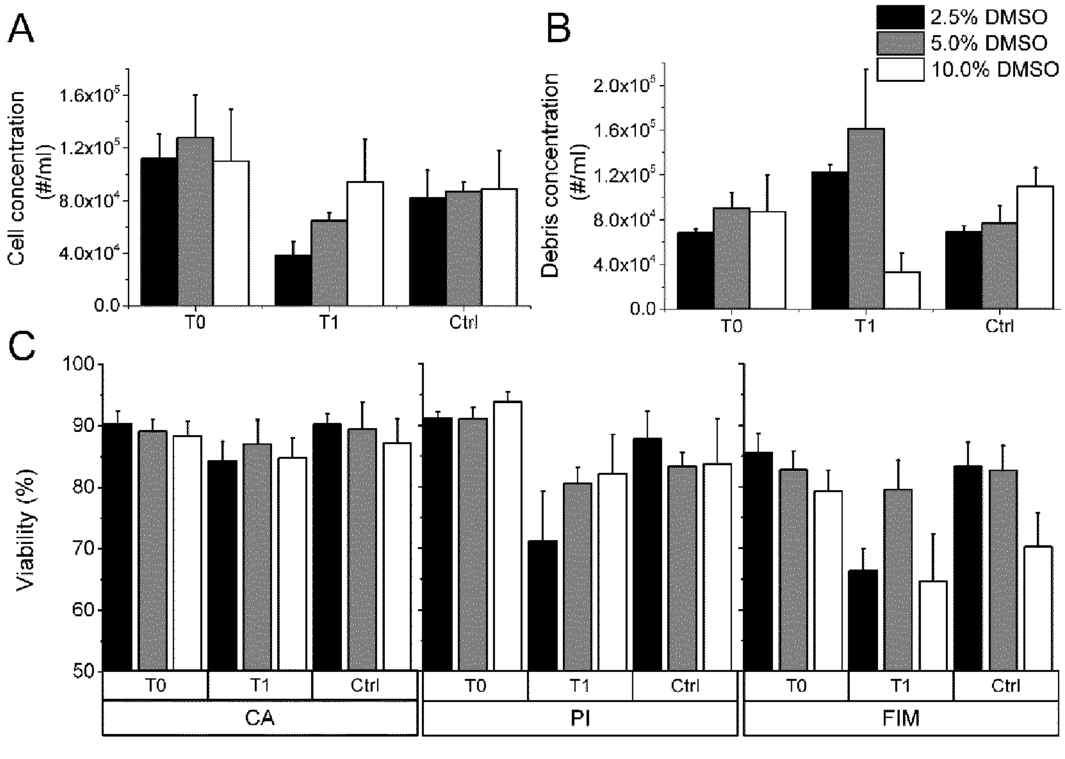
FIGS. 18A-18C show cell suspensions supplemented with DMSO at three different concentrations before (T0) and after a single freeze-thaw step following a storage for 3 hours at either −18° C. (T1) or storage for 3 hours at RT (Ctrl).

Concentrations of cells (viable and necrotic) and debris particles were determined by using FIM-CNN (FIGS. 18A-18B). With higher DMSO concentrations, higher total cell concentrations were observed after one freeze-thaw cycle, compared to lower tested cryoprotectant concentrations. Furthermore, cell suspensions with 10% (v/v) DMSO contained the lowest number of debris particles after freeze-thawing. Total cell concentrations prior to freezing (T0) and after three hours of storage at room temperature (Ctrl) were comparable for each tested DMSO concentration. Although, control cell suspensions with 10% (v/v) DMSO showed slightly elevated debris contents compared to T0 and cell suspensions with lower DMSO content.

Interestingly, cell viability determined after freeze-thawing was heavily dependent on the assay used (FIG. 18C). The calcein-AM assay suggested the smallest changes of cell viability, with 85-90% cell viability, irrespective of DMSO content and time point. In contrast, PI and FIM-CNN assays showed noticeable (ca. 20%) losses in viability for cell suspensions frozen with 2.5% (v/v) DMSO, indicating that this concentration of cryoprotectant is insufficient for cell stabilization upon freezing. The PI assay also showed a smaller drop of ca. 10% in cell viability for cell suspensions with 5% and 10% (v/v) DMSO for freeze-thawed and control samples compared to T0, whereas FIM showed such a decrease in cell viability only for cell formulations containing 10% (v/v) DMSO. The toxic effects of DMSO were demonstrated by loss of cell viability after an exposure of 3 hours at RT for each tested concentration according to the PI assay, and at 10% (v/v) based on FIM. Based on the results from PI and FIM, the best cell stabilizing properties of DMSO were achieved at 5% (v/v).

Figure 19:
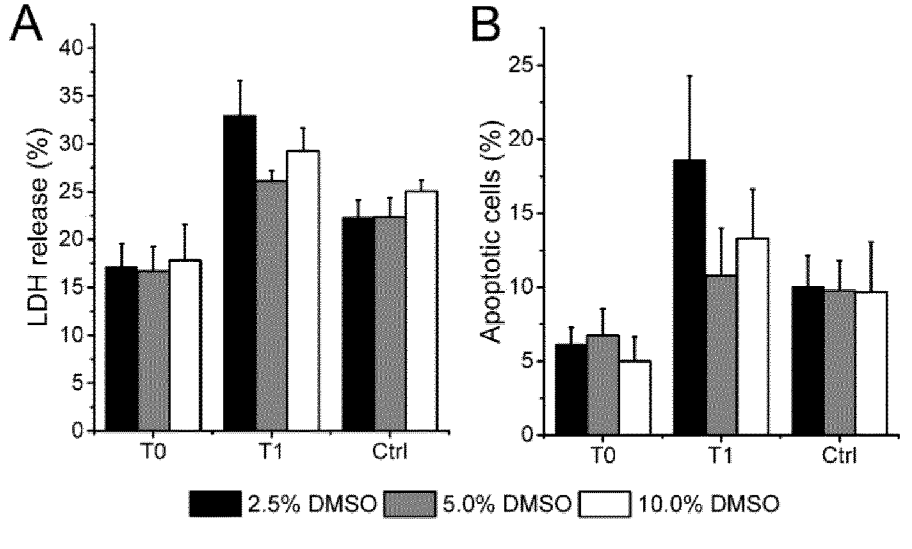
FIGS. 19A-19B show cell suspensions supplemented with dimethyl sulfoxide (DMSO) at three different concentrations, before (T0) and after a single freeze-thaw step following a storage for 3 hours at either −18° C. (T1) or storage for 3 hours at RT (Ctrl).

An increase in LDH release in the medium was observed in cell suspensions which underwent freeze-thawing or were stored at room temperature in presence of DMSO (FIG. 19A). Only small differences in LDH concentration were observed in cell formulations with different DMSO concentrations. However, cells frozen with 5% (v/v) DMSO showed a smaller release of LDH compared to suspensions with 2.5% and 10% (v/v). Similarly, the fraction of apoptotic cells was smallest for cell suspensions with 5% (v/v) upon freeze-thawing (FIG. 19B).

Example 17—Effect of Shaking Stress

Figure 20:
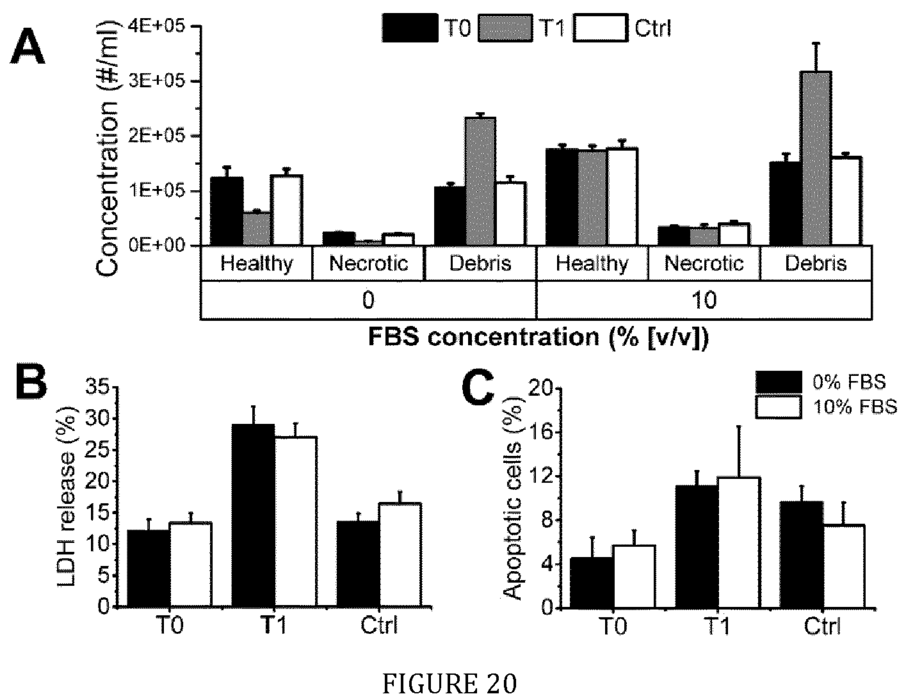
Figure 21:
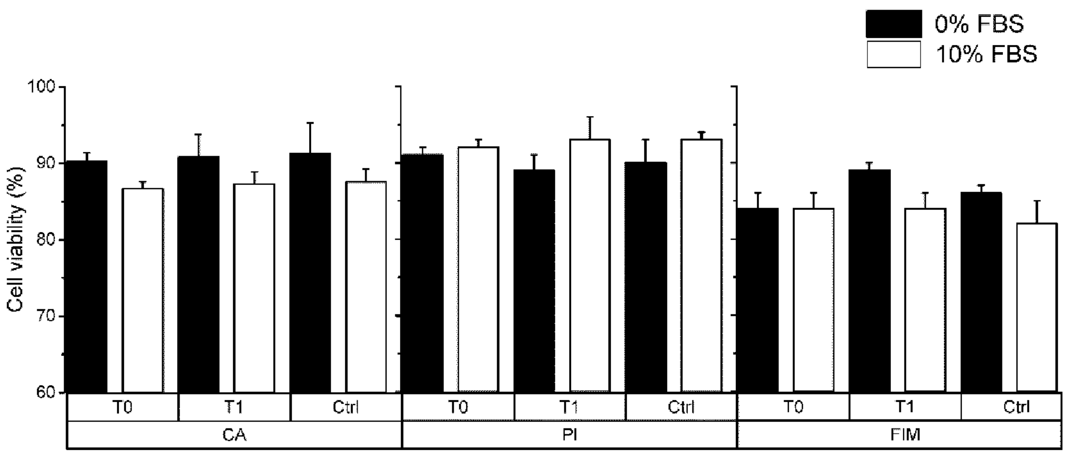
FIG. 21 shows measurements of cell viability by performing calcein-AM (CA), propiodium iodide (PI) and FIM-CNN (FIM) assays after horizontal shaking in absence and presence of 10% (v/v) FBS. Error bars represent standard deviation of mean values.

Jurkat cell suspensions were submitted to horizontal shaking in presence and absence of 10% (v/v) FBS. FIG. 20A presents the total concentration of viable and necrotic cells, as well as debris particles measured by FIM-CNN in the two cell formulations at given time points. Following shaking stress, a substantial decrease in the total number of cells was observed in formulations without FBS compared to cell suspensions containing FBS. A remarkable increase in concentration of debris particles was observed for both formulations. Notably, debris present in stressed cell suspensions supplemented with FBS originated not only from ruptured cells but also from aggregated proteins present in FBS (observed in stressed RPMI medium with 10% [v/v] FBS, data not shown). Cell viability after shaking stress and quiescent storage was very similar to the viability of cells at T0 according to all three methods used (FIG. 21).

The LDH release in stressed cell suspensions was higher compared to T0 or control cell suspensions, irrespective of FBS content. The increase in LDH release in the formulation with FBS was unexpected, given the observation that cell viability and cell concentration remained unchanged at all sampling points. A slight increase in the apoptotic cell fraction was observed after shaking in formulations with and without FBS, but a similar increase was observed in the unshaken control. Thus, shaking stress did not have a detectable impact on cell apoptosis in this study.

Example 18—Summary of Examples 13-17

Currently approved CBMPs are either stored in a cryopreserved (frozen liquid) or a non-frozen (liquid) state. In both cases, cells may be exposed to all kind of stress factors, e.g., resulting from freeze-thawing or handling in the clinic prior to administration. This may cause cell damage, loss in quality and potential clinical implications, such as serious adverse effects or lack of drug efficacy. Cells have developed mechanisms to handle certain number of stress stimuli by activating signaling pathways and stress response proteins. However, when the threshold of deleterious factors is surpassed, cells can abruptly lose membrane integrity or undergo programmed death. Within human bodies, macrophages and dendritic cells of the innate immune system are equipped with appropriate mechanisms for removal of dying cells. However, in CBMPs any cell degradants that may be formed, such as dead cells and cell debris, will remain within the product and might accelerate further cell degradation. Furthermore, debris particles originating from abruptly ruptured cells are deficient in "eat-me" signals of apoptotic cells. After administration, such necrotic cells and debris particles may trigger the immune system potentially resulting in inflammatory responses.

Viable cell concentration is considered as one of the most important quality attributes of CBMPs. A manifold of viability assays, based on the integrity of cell membrane or cellular metabolism, is available. However, common viability assays involve fluorescent staining which encompass expensive fluorescent dyes, multistep preparation procedures with incubation times, or interference with medium components. Additionally, manual gating in flow cytometers is heavily biased and difficult to reproduce between different operators. Thus, the drawbacks of these assays limit their capabilities to be robust and high-throughput methods for quantification of necrotic cells. Furthermore, classic trypan blue exclusion and other colorimetric assays are characterized by low precision and often exhibit cytotoxic effects to the cells.

In the study disclosed herein, FIM-CNN was applied to accurately determine the number of viable and necrotic cells in suspensions of up to 200,000 cells/mL based on morphological appearance of cells. Necrosis is manifested by several morphological changes to the cell appearance, including rounding of the cell and cytoplasmic swelling. These are not obvious in the FlowCam images to a human eye and are difficult to discriminate with the use of morphological parameters output by the FlowCam software. However, pattern recognition algorithms implemented in CNN models have been shown to successfully discriminate between complex fingerprints, i.e., protein aggregate structures formed upon different stress conditions, and proved to be successful in classification of cell-related particles in this study. It should be noted that each of the viability assays used may result in different outcomes given the different basis on which viability is assessed. For example, when using the calcein-AM assay, some apoptotic cells would be metabolically active and show positive staining, whereas other may be classified as necrotic. In the Annexin V-FITC and PI assay, only PI positive cells were classified as necrotic and cells undergoing early apoptosis were regarded as viable. In the conditions used in these experiments, it was not possible to discriminate apoptotic cells by using FIM-CNN, therefore apoptotic cells were randomly classified as either viable or necrotic.

The characterization of particulate matter in parenterals, like CBMPs, is described in pharmacopeial monographs and products should meet the acceptance limits for subvisible particle impurities sized above 10 μm and 25 μm. However, given the particulate nature of cells, it is challenging to fulfil specific particle testing requirements applicable to injectable products as human cells fall within the subvisible size range (typically 7-30 μm). One of the standard pharmacopeial methods for quantification of subvisible particle impurities, light obscuration, will not discriminate between cells and other particulates. Hence, high-throughput microscopy methods providing morphological data on particles within several hundred μl are promising tools for evaluation of particulates in cell-based products.

Here, by using FIM-CNN reliable numbers on the concentration of debris particles sized 1-50 μm could be obtained. Debris particles consist of a mixture of lipids, proteins, nucleic acids and potentially other extrinsic particles, thus they can be considered as particulate impurities in CBMPs. Nevertheless, the commonly applied cell characterization methods do not report on the debris content within the cell suspensions, likely omitting relevant information on the potential implications for product quality (consistency and stability) and safety of these drugs products. In addition, debris content imaged by using a bright-field-microscope in cell suspensions was previously used to assess the level of late-stage apoptotic primary human hepatocytes and MDCK cells. Similarly, it was observed that exposure of cells to stress conditions led to an increase in cellular debris which correlated well with loss in cell viability and total cell count.

The unique supply chain of some CBMPs, where at least one freeze-thaw cycle is included, makes cryopreservation crucial in conserving the integrity of the product. Cryopreservation of human cells has been widely studied and multiple factors were found to be critical in this process. The freezing and thawing rates are two of the most critical parameters to be optimized to achieve high recovery of functional cells post-thawing. However, the optimal conditions are different for each cell suspension, and the impact of the thawing rate is less understood compared to the effect of freezing rates on cells. Jurkat cells used in this study were submitted to controlled freezing with 10% (v/v) DMSO at a rate of 1° C. $min^{-1}$. Subsequent thawing at 5° C. in a water bath had deleterious effect on the viability and apoptotic rate of cells. The negative impact of slow thawing on cells may result from recrystallization of ice. Metastable ice crystals formed during freezing may have formed larger crystals upon thawing at 5° C., leading to denaturation of cellular proteins and disruption of membranes. Similar observations were made by Thorpe et al., who reported that decreasing thawing temperature led to a lower survival of mouse lymphocytes. On the other hand, the results presented herein are in disagreement with previous studies in which thawing temperature had a minimal effect on the survival of T cells. In addition to reduced viability, an increase in concentration of debris particles at lower thawing temperatures, with dense and irregular particles at the lowest thawing temperature was observed. Such debris particles were not observed in cell suspensions thawed at 20° C. and 37° C.

The presence of cryoprotectants is important for the cryopreservation of cells stored at ultra-low temperatures (vapour phase of liquid nitrogen <120° C.). DMSO is currently the most widely used cryoprotectant in cryobiology. Its amphiphilic and water-binding properties allow for a readily pass through cell membranes, thereby avoiding the efflux of water from the cytoplasm and thus preventing cellular dehydration upon freezing. At commonly used DMSO concentrations, such as 5-10% (v/v), formation of large intracellular and extracellular crystalline lattices is prevented by interfering with water molecules. Formation of ice crystals and preserving cell viability will also depend on the cooling rate, where the preferred very slow cooling rates (0.1° C. $min^{-1}$) produces fine dendritic ice structures and fast cooling rates (10° C. $min^{-1}$) generate large ice crystals. In the present study, Jurkat cells were subjected to passive (uncontrolled) freezing at −18° C. in presence of DMSO at a concentration ranging from 0% to 10% to mimic unintentional freezing. The lowest tested DMSO concentrations (i.e., 0% and 1%) did not show any cryoprotection towards cells upon freeze-thawing as nearly a complete loss in cell viability was observed. In contrast, the highest tested DMSO concentration of 10% (v/v) showed the highest cell recovery after one freeze-thaw cycle with the lowest amount of debris particles present in cell suspensions. Although, control samples (stored at RT) with the highest tested DMSO concentration showed an increase in debris particle over time, most likely due to its cytotoxic effect on cells.

Unexpectedly, the three viability assays used in this study did not provide conclusive results on the degree of protection against freeze-thawing at each tested DMSO concentration. The calcein-AM assay showed to be least sensitive in detecting changes in cell viability after freeze-thaw, whereas the PI and FIM assays detected a substantial drop in viability in suspensions with 2.5% (v/v) DMSO. However, for cell suspensions with 5% and 10% (v/v) DMSO, a reduced viability was observed with the PI assay for freeze-thawed and control samples, whereas FIM suggested minimal impact of freeze-thawing on cell viability with 5% (v/v) DMSO. Different assays may differ in their levels of sensitivity to cell viability because of their different measurement principles. In addition, post-thawed cell suspensions with 5% (v/v) DMSO showed the smallest fraction of apoptotic cells (based on Annexin V-FITC assay) and the lowest LDH release, compared to the two other tested DMSO concentrations. Similar observations were made for peripheral blood stem cells. After cryopreservation with 5% DMSO, less apoptotic and necrotic cells compared to suspensions with 10% DMSO were measured. The apoptosis-inducing effect of DMSO, via interaction with the PD-1 receptor and their ligands, was observed in the control group where a nearly 2-fold increase in apoptotic cell content was recorded.

Mechanical stress is potentially the most frequent stress factor to which biopharmaceutical products are exposed to during processing and handling. Solid-liquid and air-liquid interfaces play a crucial role in the formation of particles in protein-based formulations during agitation. Thereby, amphiphilic, non-ionic surfactants (e.g., polysorbate 20 or 80) are commonly used in order to reduce protein aggregation upon interfacial stress and mechanical shock. Unfortunately, such an approach may not be successful for CBMPs, as polysorbates have lytic effects on cells even at low concentrations. Up to date, mild shaking conditions were applied to cell suspensions mainly for the purpose of cell expansion or to induce formation of cell aggregates for creation ex vivo tissue models. In this study, harsher stress conditions were instigated to mimic potential "real-life" mechanical stress which has been shown to have detrimental effects on protein-based therapeutics. Cell suspensions filled into cryovials and positioned vertically were unaffected by shaking speeds up to 500 rpm. However, positioning of the cryovials horizontally led to a dramatic (ca. 50%) loss of total cell concentration after relatively short shaking stress at 185 rpm. Although the cell viability was unaffected by the mechanical stress according to the two fluorescence-based methods and FIM-CNN, LDH release and apoptosis were markedly increased compared to control samples. The increase in free LDH in medium suggests compromised cell quality and illustrates the value of using orthogonal cell characterization techniques. Furthermore, FBS demonstrated a protective effect towards cells upon shaking. While FBS is a commonly used supplement in cell culture and may be potentially protective towards cells against mechanical stress, it is considered as a process-related impurity that is difficult to remove in the downstream processing steps. Additionally, FBS contains proteins which are susceptible to aggregation and particle formation upon mechanical stress. Protein aggregates may on their own induce unwanted immunogenicity, which adds another unwanted and overlooked complexity with respect to particulate impurities in CBMPs. Ultimately, a wider array of compounds should be tested in cell suspensions submitted to forced degradation studies in order to allow for a decision-based formulation strategy of CBMPs.

It is disclosed herein the application of systematic forced degradation studies in the evaluation of cell stability and formulation, using Jurkat cells as model, and FIM-CNN for determining cell damage. The uniform cell line of immortalized cells may not fully reflect the behavior of cell samples used in clinics. The aging of primary human cells will introduce a much greater heterogeneity on morphological cell features and pose greater challenges for acquisition of quality parameters. However, application of CNN for image classification allowed to utilize FIM as a robust and fast analytical tool for characterization of cell suspensions, which has the potential for translation into assessment of "real-life" samples. Cell viability was assessed by using FIM-CNN in addition to other established approaches and good correlation between the methods was observed. In addition, quantification of debris particles in CBMPs was only possible with FIM-CNN, highlighting the method's ability to monitor level particulate impurities in cell suspensions. Overall, this study shows that thermal, freeze-thaw and shaking stresses are relevant tools for formulation studies on CBMPs. Further, it is presented herein the importance of choosing a broad range of analytical methods to better understand the impact of each stress factor on CBMP quality.

Example 19—Identification of Apoptotic Cells

The following materials and methods were used to identify viable, apoptotic, and necrotic cells, and debris particles.

Flow imaging microscopy (FlowCam, FIM). Cells (viable, apoptotic, and necrotic) and debris particles were quantified by using a FlowCam 8100 (Fluid Imaging Technologies, Scarborough, USA) equipped with a 50-μm flow cell. The objective used resulted in a 20× magnification and sample imaging was performed by a high-resolution CMOS camera (1920×1200 pixels) at 27 frames per second. In total, a sample volume of 140 IA was measured with an efficiency of approximately 63% (i.e., the imaged sample volume was ca. 87 i_tL). Particles imaged within the flow cell were detected with thresholds of 12 for light and dark pixels. Cleaning steps between sample measurements involved thorough flushing of the flow cell with Terg-a-zyme® enzyme detergent (1% [w/v]) and highly purified water. Collected images were not sorted by using any morphological filters and samples were measured in triplicate, unless otherwise stated.

Image Analysis Using Convolutional Neural Networks

Particle images captured by using FlowCam were analyzed by using convolutional neural networks (CNN). The CNN was based on the VGG-19 architecture as described in Example 1. Briefly, the VGG-19 network using rectified linear unit activation functions, punctuated with max-pooling and dropout layers, was pre-trained on an ImageNet dataset. The re-training of the network was performed with the first ten layers frozen in order to save computation time and improve accuracy of the model by preserving its pre-learned feature recognition capabilities. For fine-tuning the dataset was split into an 8:1:1 ratio for training, validation and testing, respectively. The model was optimized by running 15 epochs with a SGD optimization algorithm and a 0.0005 learning rate. The machine learning model was performed by using Keras (2.2.4), Tensorflow (1.13.1) Python (3.7.3) libraries and ran on a Nvidia Turing GPU with 11 GB of VRAM.

Generation of Particle Images for Population Discrimination

The CNN was retrained on manually labelled images (4,000-4,500) of each of the four populations: viable cells, apoptotic cells, necrotic cells and debris particles.

Images of viable cells were manually selected from measured samples consisting of freshly harvested Jurkat cells with a viability of 91.6% (based on PI assay). The image selection was performed by applying a size filter (10-20 μm) and an aspect ratio filter (0.6-1.0). Additionally, the image selection was manually refined by excluding cells with visible apoptotic blebs as well as with rougher surfaces. To generate images of apoptotic cells, Jurkat cells were treated with staurosporin for 3 hours (1 μM to $5\times10^5$ cells).

Apoptosis rate was approximately 90-95% as confirmed with flow cytometry (Annexin V-FITC). A size filter (10-20 μm) was applied to exclude debris and aggregates and a circularity filter (<0.9) was used to exclude the remaining viable cell images. The cell selection was manually double-checked and several debris particles were excluded. For selection of necrotic cells, two separate methods were used to induce cell necrosis. Firstly, FlowCam images of cell suspensions treated by heat (55° C. for 90 min) were collected, which showed a viability of 7.6% (based on PI assay). Secondly, cells were imaged after incubation with ethanol (10% (v/v)) for 90 min at 37° C. and had a determined viability of 12.8% (based on PI assay). In order to further define image population of necrotic cells for the network retraining, morphological parameters, such as aspect ratio, circle fit, convexity, sigma intensity and symmetry, of the population were used. Only particles (cells) of morphological parameter values falling between the $10^{th}$ and $90^{th}$ percentile of the manually selected population as necrotic cells were taken for input to the training of the model. Images of debris particles were manually selected from measured suspensions of cells submitted to vortexing for approximately 2 min or two freeze-thaw cycles (−140° C.-37° C.).

Example 20—Generation of Images of Apoptotic Cells (1)

Methods. Cells were treated with camptothecin (8 μM for 14 hours at 37° C. and 5% $CO_2$). Images of treated cells were selected manually. CNN was retrained with manually selected viable, necrotic, apoptotic cells and debris particles.

Figure 22:
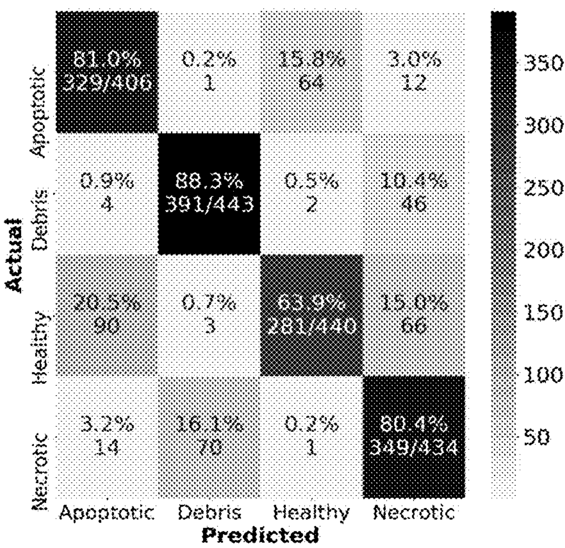
FIG. 22 shows a confusion matrix of a CNN retrained to classify viable cells, necrotic cells, apoptotic cells, and debris particles, where apoptotic cells used for retraining were induced by using camptothecin.
Figure 23:
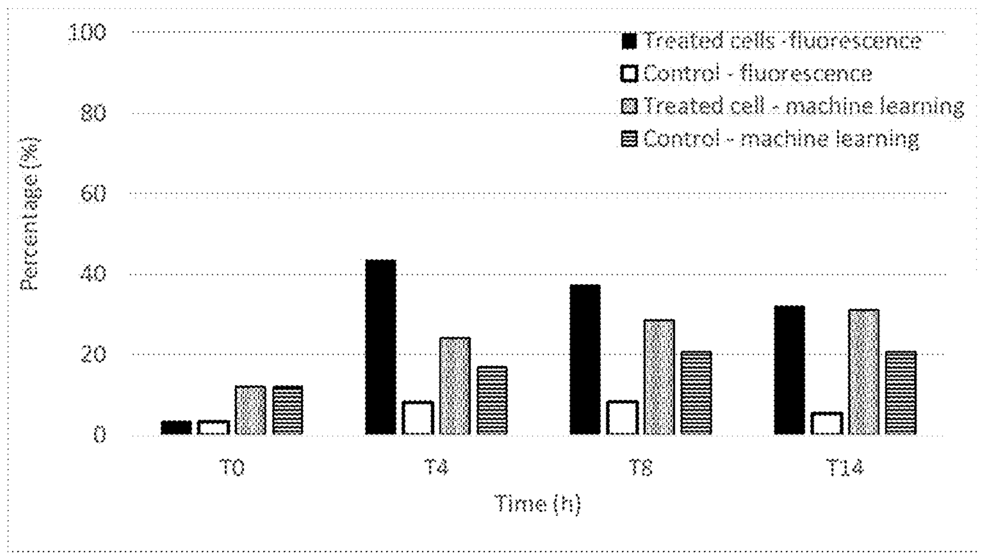
FIG. 23 shows the fraction of apoptotic cells measured by using a fluorescence-based flow cytometry assay and FIM-CNN in cell suspensions with and without camptothecin over a time course of 14 hours (incubation of cell suspensions at 37° C. and 5% $CO_2$).

Result. The classification accuracy was low when the apoptotic cell population was included −78.4% (FIG. 22). The model accuracy was insufficient to detect changes in apoptosis over time (FIG. 23).

Example 21—Generation of Images of Apoptotic Cells (2)

The aim of the present experiments was to generate cell image libraries for each class with little to no cell images belonging to other classes, e.g., minimize necrotic cells in apoptotic sample.

Methods. To generate apoptotic cells the reagent staurosporin was used (1 μM to 500.000 cells/mL) and the apoptosis rate was confirmed by a fluorescence-based assay with a flow cytometer. A double staining with Annexin V-FITC & PI was used to discriminate between viable cells, apoptotic cells and necrotic cell. The apoptosis rate was around 90%, viable cells ~2% and necrotic cells around 6%. Additionally, a large amount of debris particle was present within the sample, which was excluded in flow cytometry analysis by gating according to forward and side-scattering. The apoptotic sample was measured in parallel with the FlowCam instrument (triplicate measurement). Most of the debris particles could be easily excluded by applying a size filter (area-based diameter 6-25 μm), a circularity filter (0.5-1) and aspect ratio (0.6-1). The exclusion of the remaining debris particles, as well as healthy and necrotic cells is a greater challenge due to the amount of cell images (90,000 per replicate) as well as the close similarity of the morphological appearance by naked eye.

Freshly harvested cells were measured via FlowCam. Reference measurements by using the fluorescence-based flow cytometry assay confirmed a high cell health: >92% viable cells, ~3% apoptotic cells, 5% necrotic cells. Cell debris was excluded by using the filters explained above and additionally the cell images were manually double-checked by an operator. Every cell image resembling images from the apoptotic sample or necrotic sample were excluded. Furthermore, all cell images which were not perfectly focused and round, were excluded as well.

Figure 24:
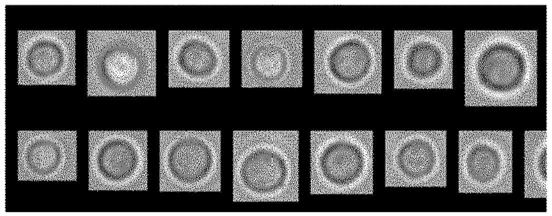
FIG. 24 shows images from the 4 categories: viable (healthy) cells, necrotic cells, apoptotic cells, and debris.
Figure 24:
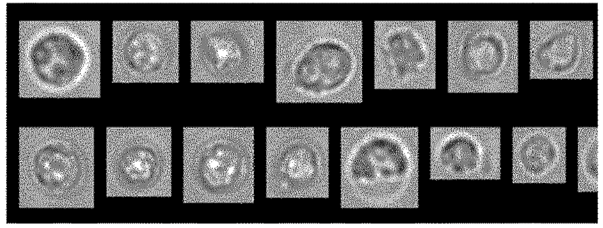
Figure 24:
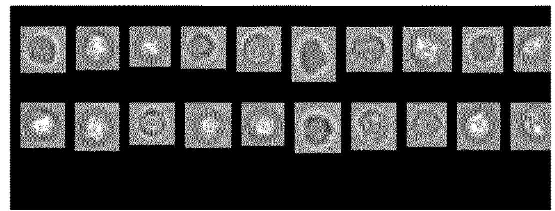
Figure 24:
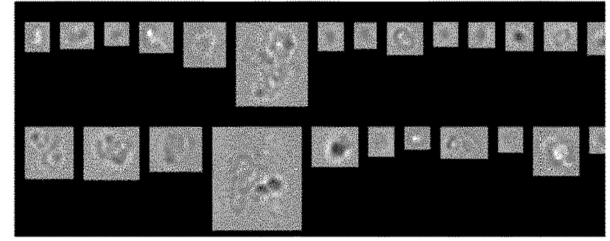
Figure 25:
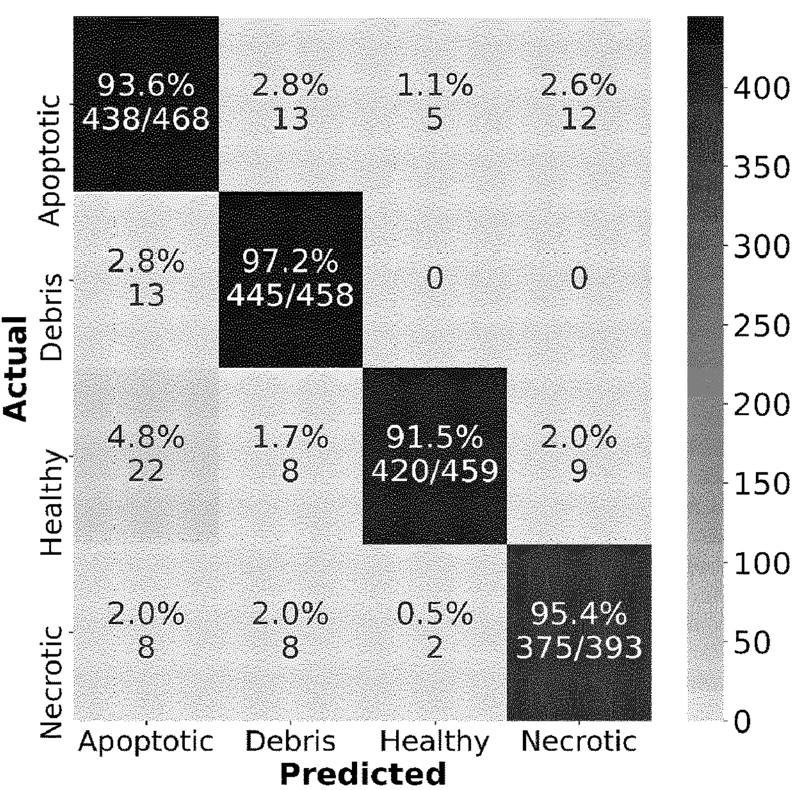
FIG. 25 shows a confusion matrix of the 4 categories: viable (healthy) cells, necrotic cells, apoptotic cells, and debris.

Results. Exemplary images are shown in FIG. 24. With this new dataset, a new CNN model was trained, the results from the training are shown in FIG. 25.

Figure 26:
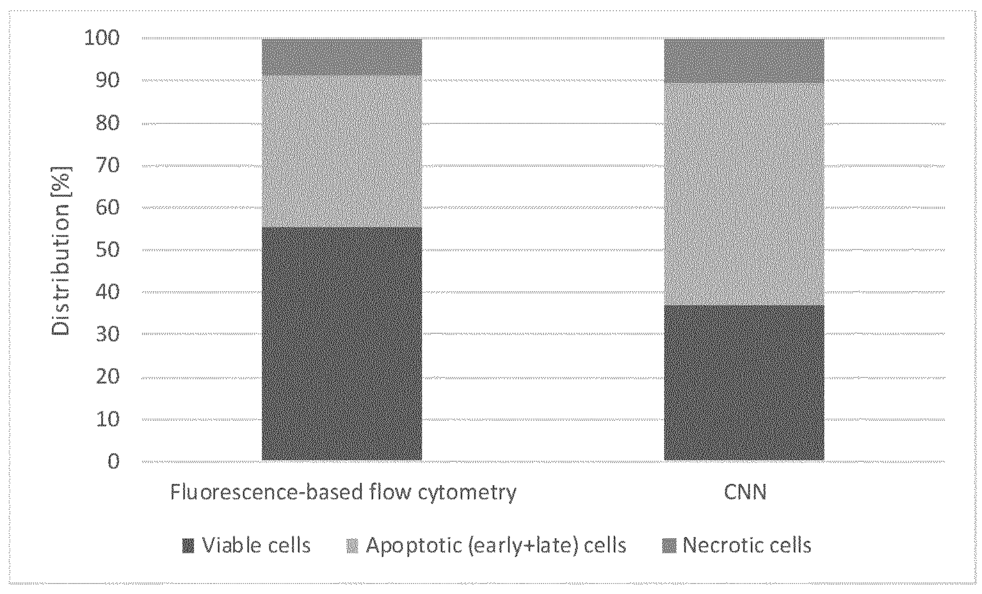
FIG. 26 shows that CNN underestimated the number of viable cells compared to fluorescence-based flow cytometry assay. Most likely CNN falsely classifies healthy cells as apoptotic because of an "over selection" of viable cells in focus while viable cells out of focus were omitted from the training dataset.

When testing a sample with the obtained CNN an underestimation of cell viability occurred, showing a deviation to fluorescence-based flow cytometry assay around 20-25% (FIG. 26). The manual reselection of healthy cells may have led to a bias of the CNN and unfocused cells were classified as debris, necrotic or apoptotic, but not healthy cells.

To check to what extent the overselection biased the CNN a pre-filter regarding the edge gradient (parameter for the focus) was tested. In detail, the images obtained from a FlowCam measurement were filtered prior CNN analysis with an edge gradient filter (50-70) and only the remaining focused cell images were tested with the CNN model. The results obtained by the CNN were in better accordance with the An. V-FITC assay (fluorescence-based flow cytometry assay) with a lower deviation of around 10-15%.

Figure 27:
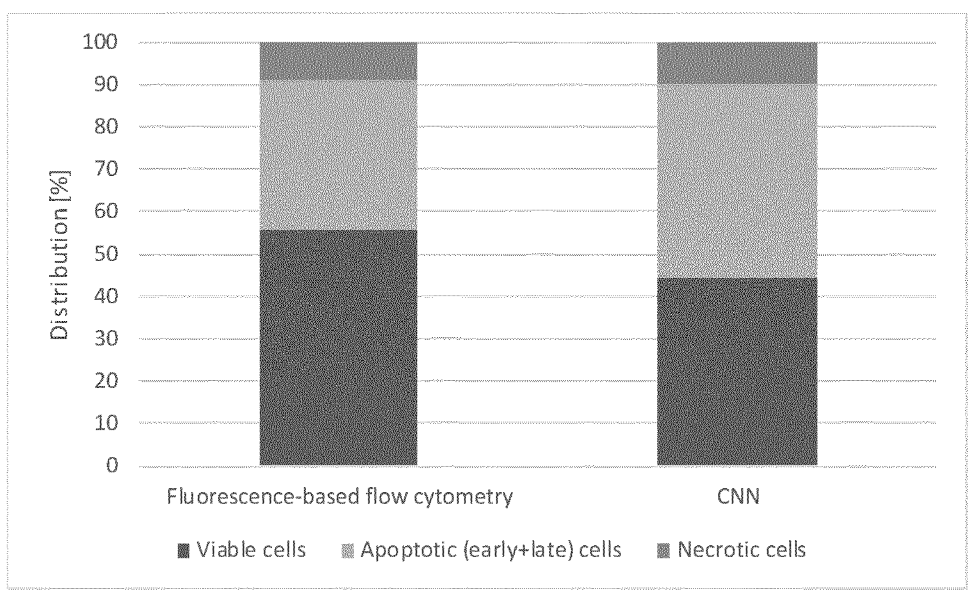
FIG. 27 shows the CNN estimation of the number of cells after images out of focus were removed from test dataset.

CNN showed relatively more viable cells (and less apoptotic cells) when the cell images which were out of focus were removed from the test dataset (FIG. 27). This result suggests that the viable cells which were out of focus were falsely classified as apoptotic cells.

Example 22—Use of Fluorescence Signals to Select Training Images

The aim of the present experiments was identifying necrotic, apoptotic, and viable cells by fluorescent signals, and using brightfield images of said cells to train a CNN.

Methods. A CNN as described in previous examples was trained with brightfield images of necrotic, apoptotic and viable cells. The brightfield images were selected based on the simultaneous fluorescence signal in the instrument's fluorescence channels. By using this approach, necrotic cells (positive PI signal), apoptotic cells (positive Annexin V-FITC signal), and viable cells (positive calcein-AM signal) can be individually identified and subsequently used for training of the CNN.

Two cell samples were stained with calcein-AM for determination of viable or necrotic cells. In addition, two samples were stained with Annexin V-FITC and PI for apoptosis and necrosis determination.

Samples were analyzed by using an Amnis FlowSight imaging flow cytometer (Luminex, Seattle, USA) and data was analyzed by using IDEAS 6.2.183 (Luminex, Seattle, USA) image analysis software. Sample measurements were carried out by using a 20× magnification objective in medium-sensitivity mode (132 mm/sec). Images of the calcein-AM stained cells were recorded in fluorescence channel 02 (532/55 nm). The 488-nm fluorescence excitation laser was set to 12 mW. Brightfield acquisition was set to channel 9 (582/25 nm) with automatically set intensities. For Annexin V-FITC/PI, the excitation power of the FlowSight imaging flow cytometer was reduced to 4 mW, the same instrument settings as described above for the calcein-AM assay were used. Brightfield as well as fluorescence images in channels 02 (532/55 nm) for Annexin V-FITC and channel 04 (610/30 nm) for PI were recorded.

For training of the CNN, ca. 4000 brightfield images of cells used were taken from the populations. For necrotic cells, images were taken from the brightfield channel corresponding to a positive signal in the fluorescence channel detecting PI. For apoptotic cells, images were taken from the brightfield corresponding to positive fluorescence staining with Annexin V-FITC. For viable cells, images were taken from the brightfield channel which corresponded to a positive signal in the fluorescence channel detecting calcein-AM. Debris particles were excluded from analysis in this experiment.

Figure 28A:
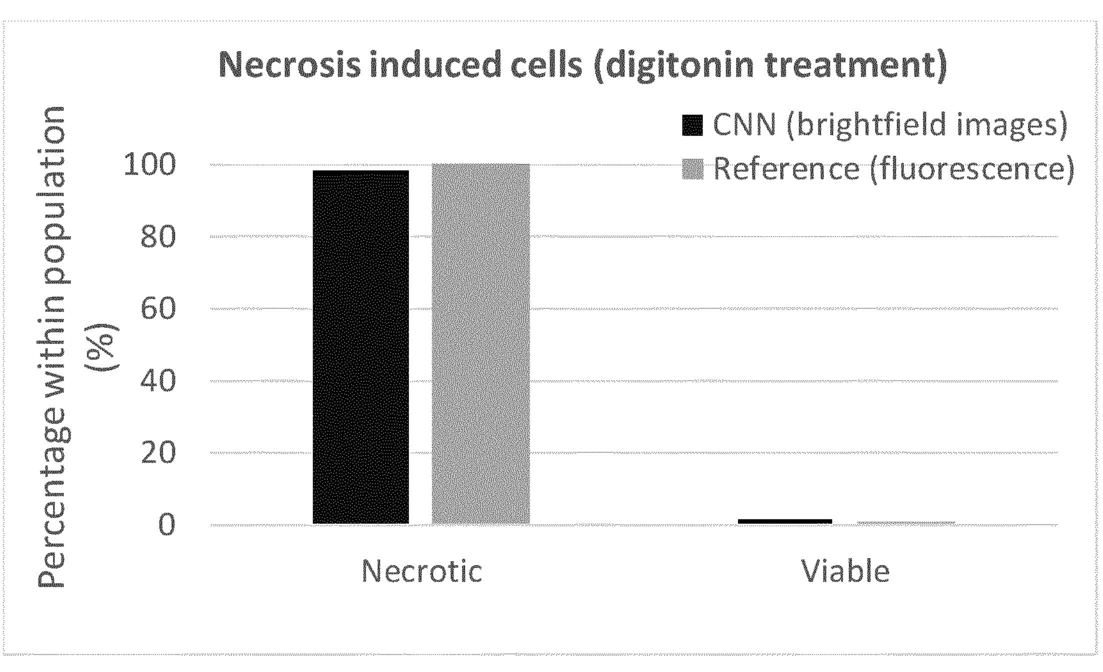
FIGS. 28A-28B show classification of viable and necrotic cells by a CNN trained with brightfield images and calcein-AM staining (fluorescent reference) obtained by imaging flow cytometry.
Figure 28B:
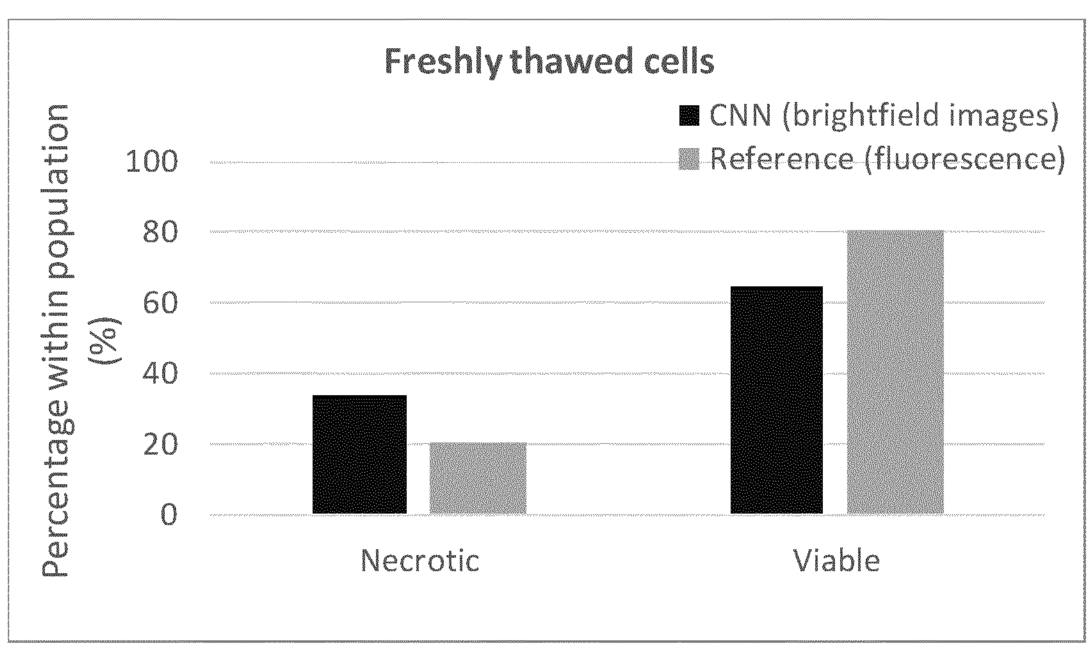

Results. Results from the differentiation between viable and necrotic cells by using calcein-AM staining are shown in FIG. 28. For a cell sample treated with digitonin to induce necrosis, results between the CNN using brightfield images and fluorescence were in good agreement (FIG. 28A). In case of a freshly thawed cell sample, the CNN overestimated the number of necrotic cells compared to the fluorescent reference (FIG. 28B).

Figure 29A:
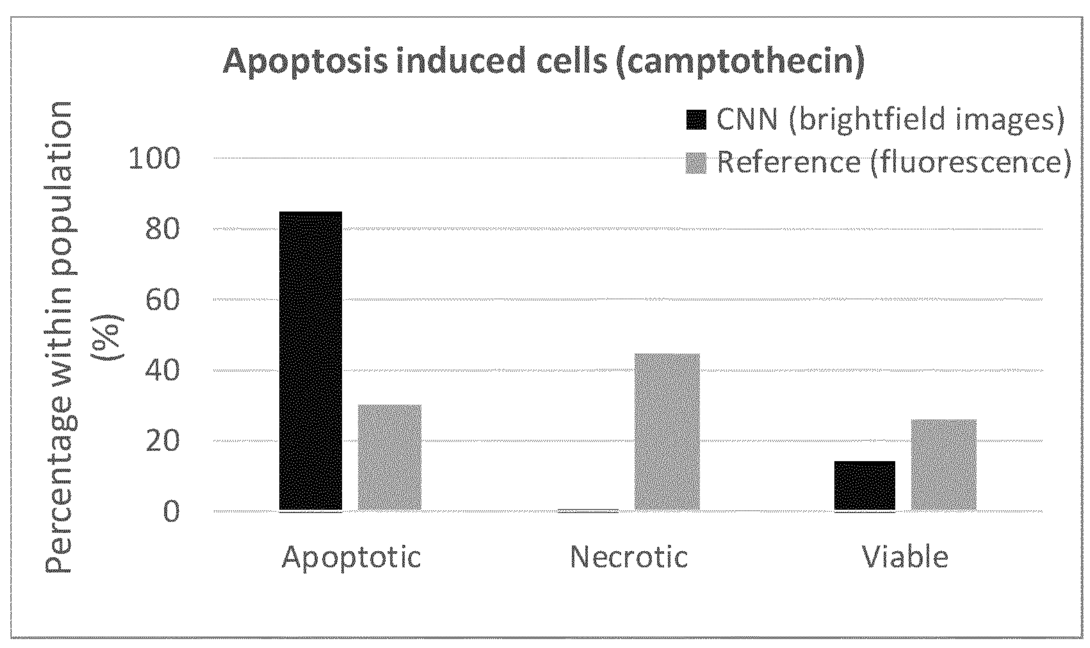
FIGS. 29A-29B show classification of apoptotic and viable cells by a CNN trained with brightfield images and Annexin V-FITC/PI staining (fluorescent reference) obtained by imaging flow cytometry.
Figure 29B:
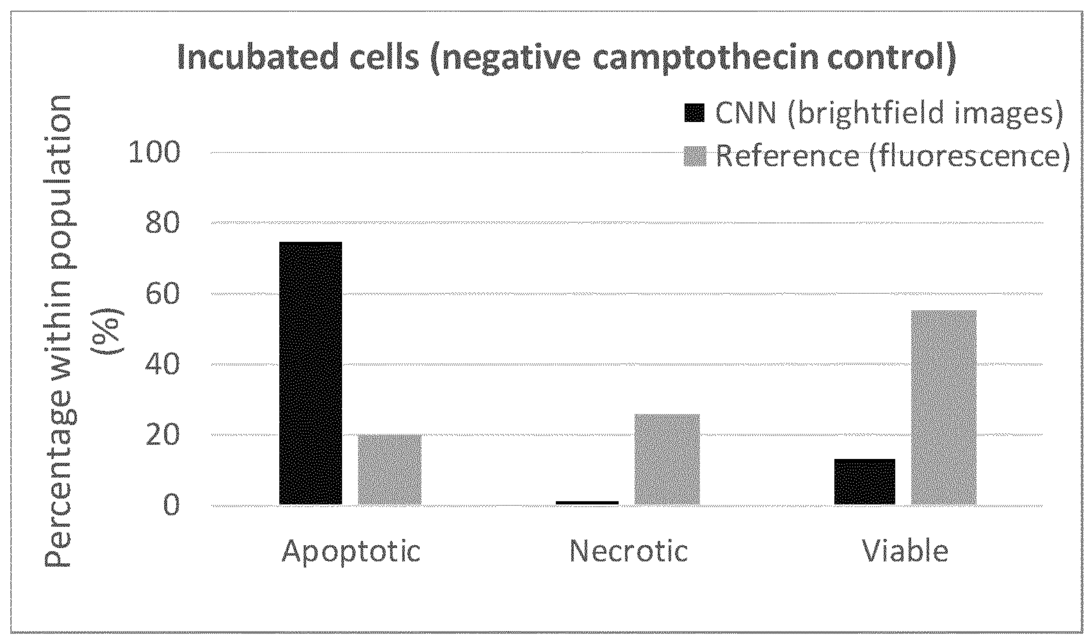

When camptothecin was used to induce apoptosis, the CNN overestimated the population of apoptotic cells (FIG. 29A). Furthermore, apparently necrotic and viable cells were identified as apoptotic cells by the CNN using the brightfield images in comparison to the fluorescent reference (FIG. 29A). Similarly, in the untreated negative control, the CNN underestimated the number of viable cells (FIG. 29B).

Figure 30:
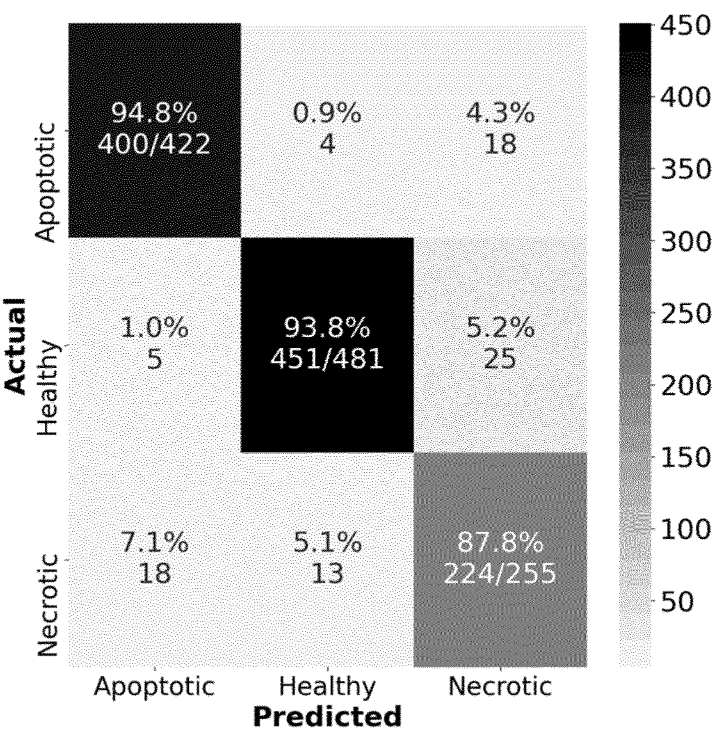
FIG. 30 shows a confusion matrix of a CNN classifying viable (healthy), necrotic, and apoptotic cells.

FIG. 30 shows the confusion matrix for the classification of viable, necrotic, and apoptotic cells.

Example 2—Robustness of Induction of Necrosis and Retraining of CNN

The aim of the present experiment was to generate a new dataset of necrotic cell images and to retrain a new CNN in order to demonstrate the robustness of induction of necrosis and retraining of the CNN.

Methods. A CNN was retrained with newly selected training image libraries according to the methods described in Example 21. For that, cell images generated for viable cells, apoptotic cells and cell debris were revisited and between 4,000 and 5,000 images were manually selected. For the necrotic class a new data set was generated by inducing necrosis either by incubating the cells at 55° C. for 90 min, or by incubating the cells with 10% (v/v) ethanol for 90 minutes. Around 4,000 to 5,000 necrotic cell images were manually selected.

Figure 31:
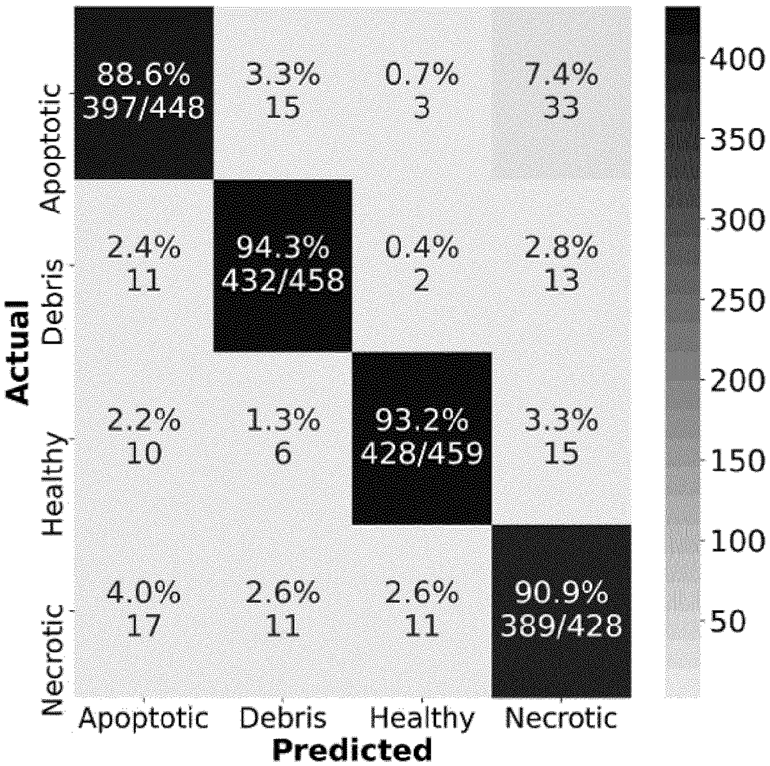
FIG. 31 shows a confusion matrix of a CNN classifying viable (healthy) cells, necrotic cells, apoptotic cells, and debris. The CNN was trained with an optimized training image data set of the preparation comprising the viable cells, apoptotic cells and debris used for FIG. 25, and images from a new preparation of necrotic cells.

Results. Retraining of a new CNN with the new data set of necrotic cells obtained by two different methods resulted in good classification accuracy of all four classes (FIG. 31), and were comparable to the results from retraining of the previous CNN (FIG. 25). Next, by using images from a measurement that was not part of the training, the distributions of predicted classes obtained by CNNs trained with the two different datasets of necrotic cells were compared with the distribution of classes obtained by fluorescence-based flow cytometry. The CNN trained with the new set of necrotic cells was more accurate at predicting healthy cells (FIG. 32), demonstrating the robustness of CNN retraining and the optimized training dataset.

Example 24—Generation of Viable Cells with Different Morphologies

The aim of the present study was to train the CNN to discriminate between viable (healthy) cells with different morphologies. In order to do so, cells were suspended in solutions with different osmolalities, thus affecting the cells' volume and consequently the cells' morphologies.

Methods. Solutions were prepared in the hypotonic range by diluting phosphate buffered saline (PBS) with highly purified water. The osmolalities were 220, 250 and 270 mOsm/kg. Additionally, hypertonic PBS solutions were prepared by adding different amounts of sucrose. The osmolalities were 350, 400, 420 and 450 mOsm/kg. For isotonic conditions PBS was used as provided by the manufacturer. Freshly harvested cells were used to generate image training libraries for viable cells in each osmotic range, i.e., hypotonic, isotonic and hypertonic. Cell viability of the isotonic sample was confirmed by Annexin V-FITC/PI and by Calcein AM/PI fluorescence assays. Annexin V-FITC/PI assay determined 77% viable cells, 9% apoptotic cells, and 14% necrotic cells. Calcein AM/PI assay determined 89% viable cells and 11% necrotic cells. Cells were centrifuged and resuspended in each solution with adjusted osmolality for 5 minutes prior to FlowCam measurements. Images of viable cells were manually selected in a size range between 6 and 25 μm (diameter (ABD)) for each osmotic range (4,000 to 5,000 images). The CNN was trained on these new viable cell images, whereas the training libraries for apoptotic cells, necrotic cells and cell debris were those used in Example 23.

Results. Healthy cells were divided in "Hypo", "Iso" and "Hyper" for each osmotic range. This avoided heterogeneity within the training images of viable cells because of different cell morphologies in hypotonic (swollen) and hypertonic (shrunken) solution conditions. The CNN was trained on manually selected images (4,000-4,500) from each of the six categories: cells in hypotonic solutions, cells in isotonic solution, cells in hypertonic solutions, apoptotic cells, necrotic cells and debris particles.

Figure 32:
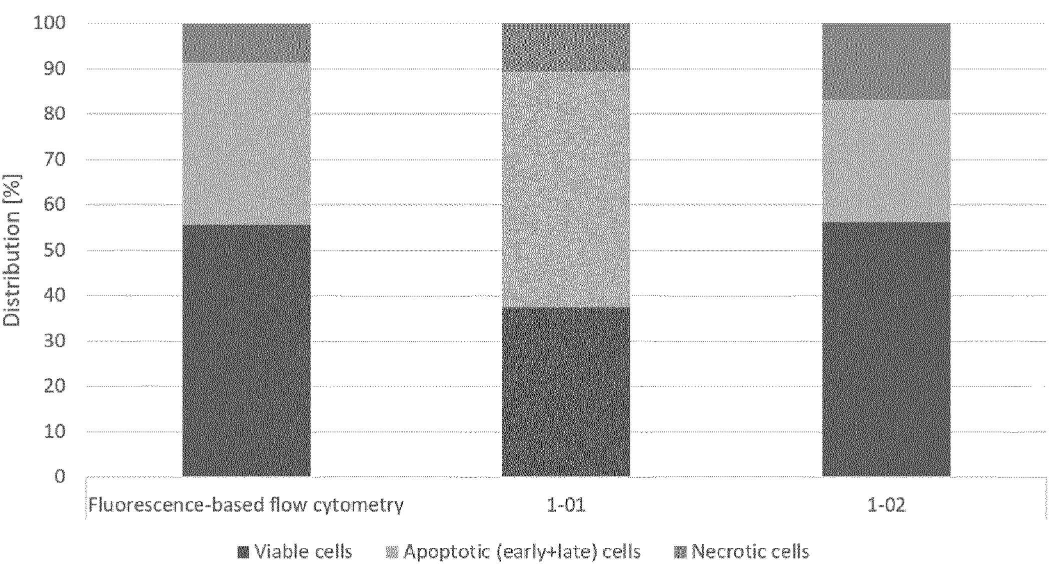
FIG. 32 shows the distribution of predicted classes obtained by CNN classifiers trained with two different training data sets of necrotic cells (1-01 and 1-02). The distribution of classes as determined by fluorescence-based flow cytometry is used as a reference.
Figure 33:
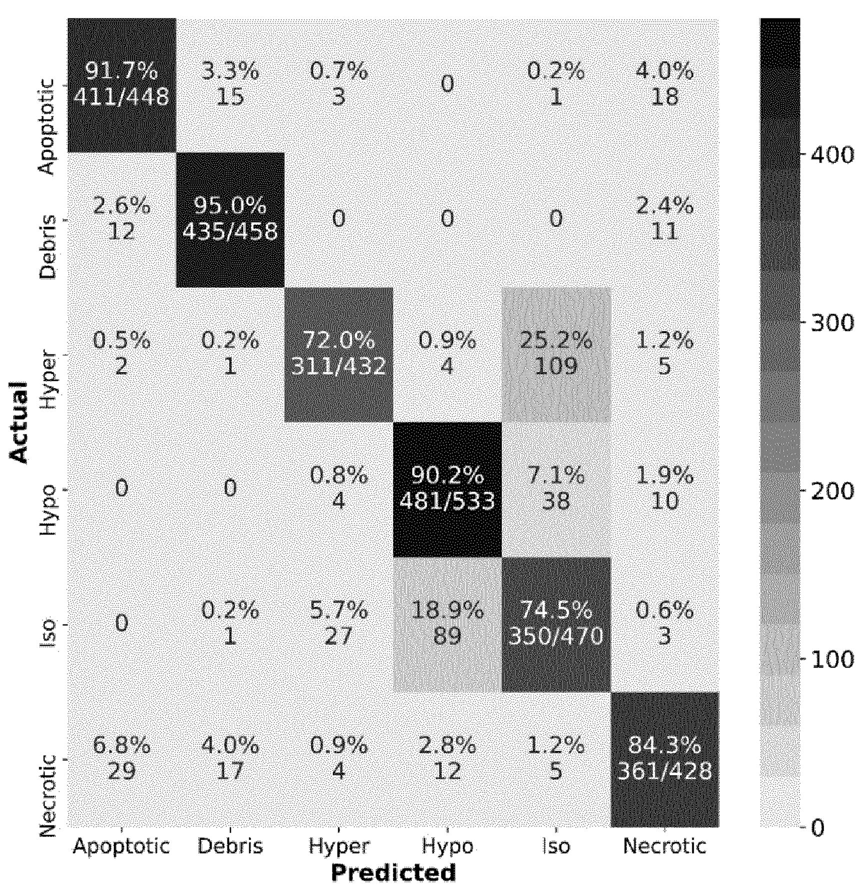
FIG. 33 shows a confusion matrix of a CNN classifying viable cells incubated in isotonic (Iso), hypotonic (Hypo) and hypertonic (Hyper) conditions, necrotic cells, apoptotic cells, and debris.
Figure 34:
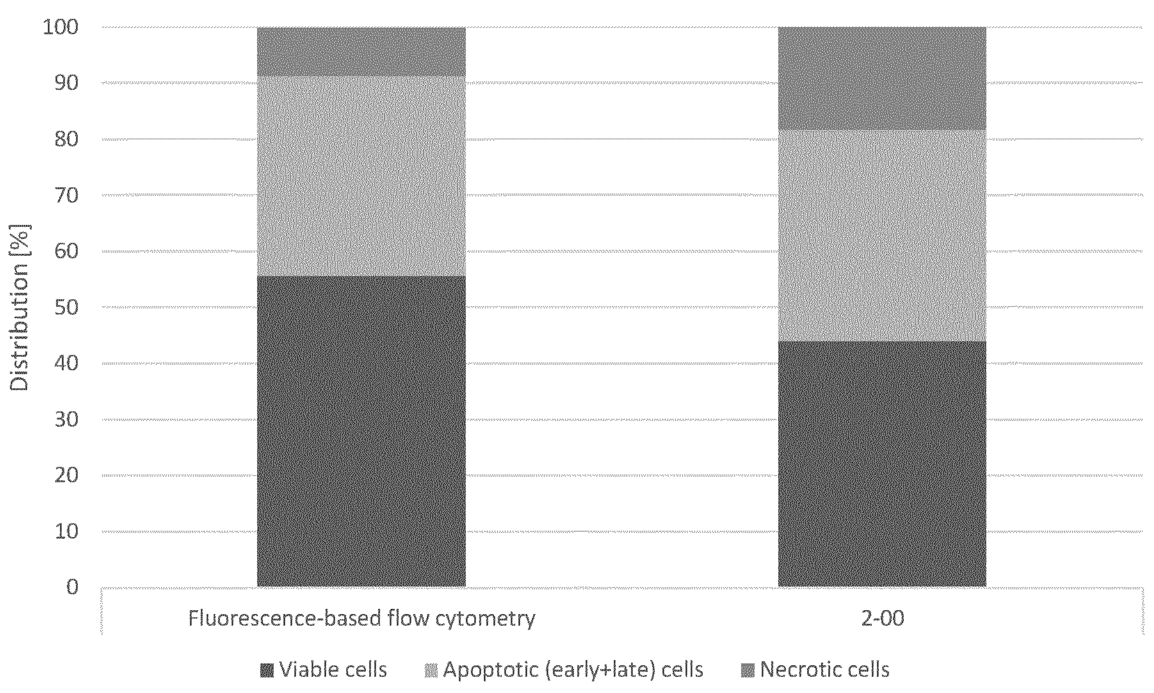
FIG. 34 shows a comparison between a fluorescence-based flow cytometry assay and the prediction of the CNN classifying viable cells incubated in isotonic solution (2-00). Viable cells represent the sum of the Iso, Hypo and Hyper classes.

The CNN trained with six cell categories showed a high classification accuracy (FIG. 33). Then, the classes Iso, Hypo and Hyper were combined in order to determine the total amount of predicted viable cells. The CNN had a distribution of predicted classes similar to the distribution of classes obtained of fluorescence-based flow cytometry (FIG. 34), and similar to the previous models 1-01 and 1-02 (FIG. 32).

Figure 35A:
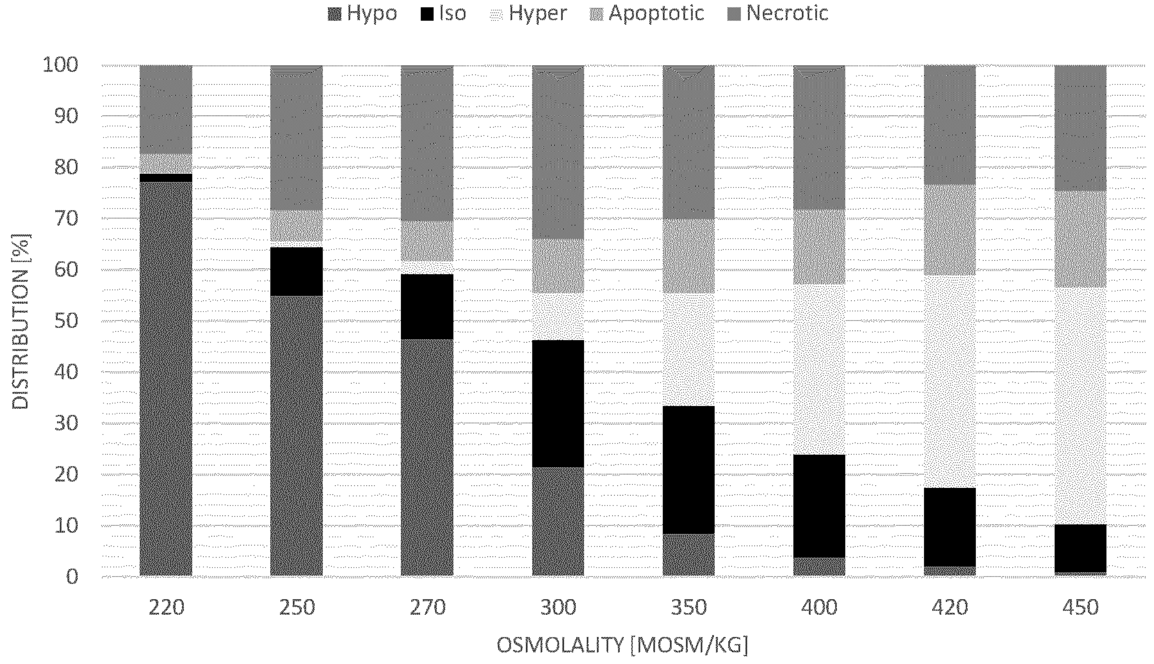
FIGS. 35A and 35B show the CNN classification of samples with cells incubated for 5 min before FlowCam measurement in osmolalities ranging from 220 to 450 mOsm/kg.
Figure 35B:
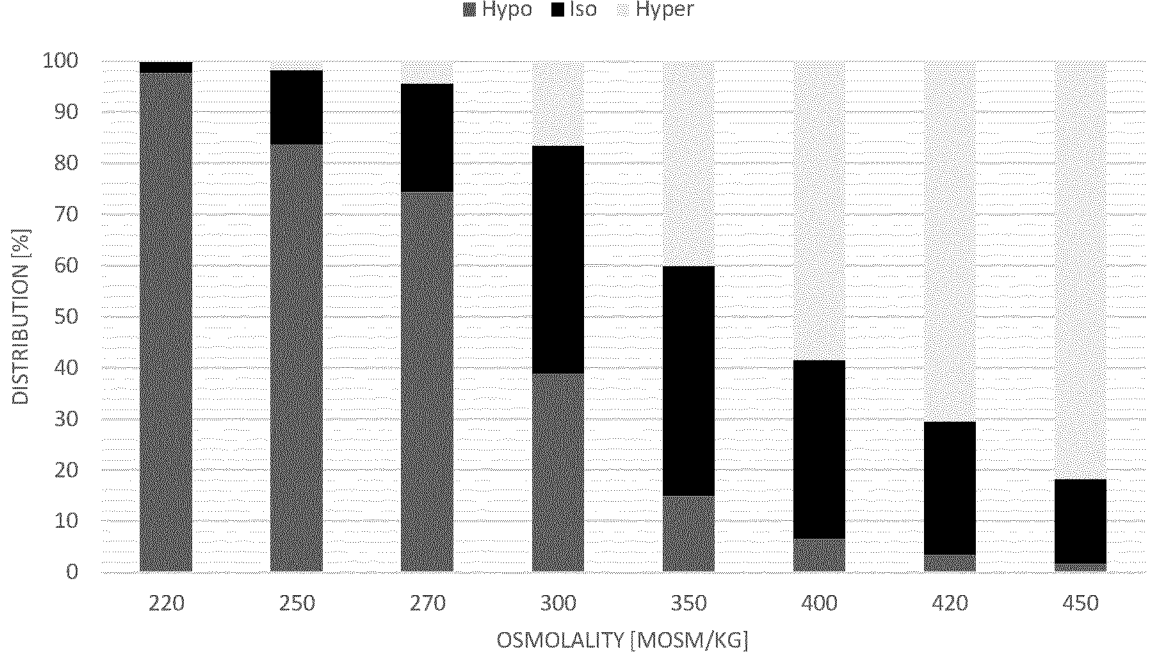

Subsequently, healthy cells were incubated for 5 minutes in osmolalities ranging from 220 to 450 mOsm/kg, their images were captured by FIM, and then classified by the CNN. The CNN successfully classified the cells according to the osmolality condition (Hyper, Iso, Hypo) in which they were incubated. As expected, with decreasing osmolality the number of viable cells in the "Hypo" class increased (hypotonic range<300 mOsm/kg), whereas the number of cells in the "Hyper" class increased with increasing osmolality (hypertonic range>300 mOsm/kg) (FIGS. 35A and 35B).

The invention claimed is:

1. A method for quantifying single viable cells and/or particulate impurities in a cell-based product sample, said method comprising:

a) providing a training set of classified flow-imaging microscopy (FIM) images comprising single viable cells, debris, and at least one of: necrotic cells, apoptotic cells, doublet cells, magnetic beads, or adducts;
b) training a convolutional neural network (CNN) with the classified images of step (a);
c) capturing FIM images from said product sample;
d) identifying single viable cells, debris, and at least one of: necrotic cells, apoptotic cells, doublet cells, magnetic beads, or adducts, by applying the trained CNN obtained in step (b) to the FIM images of step (c); and
e) quantifying the single viable cells and/or the particulate impurities identified in step (d):

wherein said classified images of step (a) are obtained by a method comprising:

i) providing a cell suspension;

ii) applying to said cell suspension conditions that induce necrosis, apoptosis, cell debris, adducts, or any combination thereof;

iii) optionally labeling the cells;

iv) obtaining FIM images of said cell suspension; and v) classifying said FIM images;

and wherein:

i) said conditions that induce necrosis comprise incubating cells at 55° C. for 90 min, or at 37° C. for 90 min in a cell culture comprising 10% ethanol;

ii) said conditions that induce apoptosis comprise incubating the cells with 1 μM staurosporin for 3 hours at 37° C.;

iii) said conditions that induce debris comprise vortexing cells in a 2-mL microcentrifuge tube for 2 min, or submitting the cells to two freeze-thaw cycles from −140° C. to 37° C.; and iv) said conditions that induce adducts comprise incubating magnetic beads with cells in a 1:1 ratio for 1.5 hours at 37° C.

2. The method of claim 1, wherein said set of classified images comprises:

single viable cells, necrotic cells, apoptotic cells, doublet cells, magnetic beads, adducts, and debris;

single viable cells, doublet cells, magnetic beads, adducts, and debris;

single viable cells, necrotic cells, and debris; or single viable cells, necrotic cells, apoptotic cells, and debris.

3. The method of claim 1, wherein said necrotic cells from said training set comprise cells incubated at 37° C. for 90 min in a cell culture comprising 10% ethanol, and cells incubated at 55° C. for 90 min.

4. The method of claim 1, wherein said viable cells from said training set comprise cells incubated in a hypotonic medium, cells incubated in an isotonic medium, and cells incubated in a hypertonic medium.

5. The method of claim 1, wherein said CNN is pre-trained before step (b) with a pre-training set of images, comprises a VGG-19 architecture, or comprises its last two fully connected layers active or its first ten layers frozen during said training of step (b), or a combination thereof.

6. The method of claim 1, wherein said training of step (b) comprises the Adam optimization algorithm, or the SGD optimization algorithm.

7. The method of claim 1, wherein said cell-product comprises T cells.

8. A method for quantifying single viable cells and/or particulate impurities in a cell-based product sample, said method comprising:

a) providing a cell suspension comprising single viable cells, necrotic cells, and/or apoptotic cells, wherein conditions that induce necrosis, apoptosis, cell debris, adducts, or any combination thereof were applied to said cell suspension;

b) simultaneously obtaining a brightfield image and a fluorescent signal from said cell suspension using an imaging flow cytometer;

wherein said fluorescent signal is used to attribute a classification label to said brightfield image, according to whether said brightfield image comprises a viable cell, a necrotic cell, or an apoptotic cell;

c) training a convolutional neural network (CNN) with the brightfield images of step (b);

d) capturing flow-image microscopy (FIM) images from said product sample;

e) identifying single viable cells, debris, and at least one of: necrotic cells, apoptotic cells, doublet cells, magnetic beads, or adducts, by applying the trained CNN obtained in step (c) to the FIM images of step (d);

f) quantifying the single viable cells and/or the particulate impurities identified in step (e);

wherein:

i) said conditions that induced necrosis in said cell suspension comprise incubating cells at 55° C. for 90 min, or at 37° C. for 90 min in a cell culture comprising 10% ethanol;

ii) said conditions that induced apoptosis in said cell suspension comprise incubating the cells with 1 μM staurosporin for 3 hours at 37° C.;

iii) said conditions that induced debris in said cell suspension comprise vortexing cells in a 2-mL microcentrifuge tube for 2 min, or submitting the cells to two freeze-thaw cycles from −140° C. to 37° C.; and iv said conditions that induced adducts in said cell suspension comprise incubating magnetic beads with cells in a 1:1 ratio for 1.5 hours at 37° C.

* * * * *